United States Patent
Gao et al.

(10) Patent No.: US 9,628,240 B2
(45) Date of Patent: Apr. 18, 2017

(54) METHOD AND DEVICE FOR SIMULTANEOUS TRANSMISSION OF ACK/NACK FEEDBACK INFORMATION AND PERIODIC CQI/PMI/RI FEEDBACK BITS

(75) Inventors: Xuejuan Gao, Beijing (CN); Zukang Shen, Beijing (CN); Yanan Lin, Beijing (CN)

(73) Assignee: DATANG MOBILE COMMUNICATIONS EQUIPMENT CO., LTD, Beijing (CN)

(*) Notice: Subject to any disclaimer, the term of this patent is extended or adjusted under 35 U.S.C. 154(b) by 236 days.

(21) Appl. No.: 14/002,105

(22) PCT Filed: Nov. 9, 2011

(86) PCT No.: PCT/CN2011/081996
§ 371 (c)(1),
(2), (4) Date: Aug. 28, 2013

(87) PCT Pub. No.: WO2012/062209
PCT Pub. Date: May 18, 2012

(65) Prior Publication Data
US 2014/0023011 A1    Jan. 23, 2014

(30) Foreign Application Priority Data
Nov. 9, 2010   (CN) .......................... 2010 1 0539328

(51) Int. Cl.
*H04W 4/00* (2009.01)
*H04L 12/28* (2006.01)
(Continued)

(52) U.S. Cl.
CPC ......... *H04L 5/0055* (2013.01); *H04B 7/0636* (2013.01); *H04L 1/0031* (2013.01);
(Continued)

(58) Field of Classification Search
CPC .................................................. H04L 5/0055
(Continued)

(56) References Cited

U.S. PATENT DOCUMENTS

2009/0046805 A1* 2/2009 Kim et al. ................... 375/295
2011/0103247 A1* 5/2011 Chen et al. .................. 370/252
(Continued)

FOREIGN PATENT DOCUMENTS

| CN | 101383683 A | 3/2009 |
|---|---|---|
| CN | 101729217 A | 6/2010 |

(Continued)

OTHER PUBLICATIONS

International Search Report of PCT/CN2011/081996, mailed Feb. 23, 2012.
(Continued)

*Primary Examiner* — Gerald Smarth
(74) *Attorney, Agent, or Firm* — Oliff PLC

(57) ABSTRACT

Disclosed are a method and device for simultaneous transmission of ACK/NACK feedback information and periodic CQI/PMI/RI feedback bits. By way of using the technical solution of the embodiments of the present invention, the periodic CQI/PMI/RI feedback bits and ACK/NACK feedback information can be simultaneously transmitted in the same uplink sub-frame using PUCCH format 3 in an LTE-A system, thus avoiding the situation that the transmission of the periodic CQI/PMI/RI information needs to be abandoned when the ACK/NACK feedback information and the periodic CQI/PMI/RI information are transmitted simultaneously in the same uplink sub-frame, improving the feedback efficiency of the uplink control information.

18 Claims, 11 Drawing Sheets

(51) Int. Cl.
     *H04L 5/00*          (2006.01)
     *H04L 1/00*          (2006.01)
     *H04L 1/16*          (2006.01)
     *H04B 7/06*          (2006.01)

(52) U.S. Cl.
     CPC .......... *H04L 1/1621* (2013.01); *H04L 1/1671* (2013.01); *H04B 7/063* (2013.01); *H04B 7/0632* (2013.01); *H04B 7/0639* (2013.01)

(58) Field of Classification Search
     USPC ........................................................ 370/329
     See application file for complete search history.

(56) References Cited

U.S. PATENT DOCUMENTS

| | | | | |
|---|---|---|---|---|
| 2011/0141928 A1* | 6/2011 | Shin et al. | .................... | 370/252 |
| 2011/0249584 A1* | 10/2011 | Barbieri et al. | ............. | 370/252 |
| 2011/0249643 A1* | 10/2011 | Barbieri et al. | ............. | 370/329 |
| 2011/0310759 A1* | 12/2011 | Gerstenberger | ........ | H04L 5/001 370/252 |
| 2011/0312332 A1* | 12/2011 | Choudhury et al. | ....... | 455/452.2 |

FOREIGN PATENT DOCUMENTS

| | | |
|---|---|---|
| CN | 101742452 A | 6/2010 |
| CN | 101771502 A | 7/2010 |

OTHER PUBLICATIONS

International Preliminary Report on Patentability and Written Opinion of the International Searching Authority for PCT/CN2011/081996 dated May 14, 2013.

\* cited by examiner

METHOD AND DEVICE FOR SIMULTANEOUS TRANSMISSION OF ACK/NACK FEEDBACK INFORMATION AND PERIODIC CQI/PMI/RI FEEDBACK BITS

CROSS REFERENCE TO RELATED APPLICATIONS

This application is the National Stage of PCT/CN2011/081996 filed on 9 Nov. 2011, which claims priority under 35 U.S.C. §119 of Chinese Application CN 201010539328.2 filed on 9 Nov. 2010, the disclosure of which is incorporated by reference. The international application under POT article 21(2) was not published in English.

FIELD OF THE PRESENT INVENTION

The present invention relates to the field of communication technology, in particular to the method and device for simultaneous transmission of ACK/NACK feedback information and periodic CQI/PMI/RI feedback bits.

BACKGROUND OF THE PRESENT INVENTION

For an LTE (Long Term Evolution) multicarrier system, to support a wider system bandwidth than the system, for example, 100 MHz, one possible way is to directly allocate the spectrum of 100M bandwidth as shown in FIG. 1; another possible way is to aggregate some spectra allocated to the existing system to constitute a large bandwidth for the system. At this time, uplink and downlink carriers in the system can be configured asymmetrically, that is to say, users may occupy N (N≥1) carriers for downlink transmission and M (M≥1) carriers for uplink transmission as shown in FIG. 2.

An LTE-A (Long Term Evolution Advanced) system can support 5 carriers at most now for aggregation. An LTE-A UE (User Equipment) should feedback the ACK (Acknowledgement)/NACK (Negative Acknowledgement) feedback information of several downlink carriers and sub-frames in one uplink sub-frame. At present, in the LTE-A system, the number of ACK/NACK information bits fed back by UE is determined based on the configured downlink carriers and the transmission mode of each downlink carrier, that is to say, in a FDD (Frequency Division Duplex) system, UE should feed back $$\sum_{i=1}^{N} C_i$$

bits of ACK/NACK in an uplink sub-frame, wherein, $C_i$ refers to the number of codewords of each downlink carrier (C=1 during single-codeword transmission, while C=2 during multiple-codeword transmission), the transmission mode (namely the number of codewords) of different downlink carriers can be different and N means the number of downlink carriers configured by UE. In a TDD (Time Division Duplex) system, UE should feed back $$\sum_{i}^{N} C_i \cdot M_i$$

bits of ACK/NACK in an uplink sub-frame, wherein, $M_i$ is the number of downlink sub-frames for UE to feed back the ACK/NACK in an uplink sub-frame of the $i^{th}$ carrier and M, namely the number of K in each column of Table 1, is different for different downlink configurations and uplink sub-frames, which corresponds to several downlink sub-frames for the same uplink sub-frame to feed back the ACK/NACK, hereinafter referred to as "feedback window".

TABLE 1

Downlink Association Set Index K: {k₀, k₁, ...k_{M−1}} for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 5, 4 | — | — | — | — | — | — |
| 4 | — | — | 12, 8, 7, 11 | 6,5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an LTE-A system, PUCCH (Physical Uplink Control Channel) format 1b with to channel selection and PUCCH format 3 can be adopted as the multiplexing transmission scheme for not more than 4 bits of ACK/NACK information, wherein, the maximum number of transmission bits for the PUCCH format 1b with channel selection transmission scheme is 4 bits. PUCCH format 3 is a new ACK/NACK transmission scheme based on DFT-S-OFDM with the structure shown in FIG. 3, wherein, RM (32,O) block codes are used for channel encoding to transmit 20 bits of the feedback information at most. Spread spectrum sequences with the spreading factor of 5 are adopted in a time domain, so a PRB (Physical Resource block) can multiplex 5 users for simultaneous transmission. PUCCH format 2/2a/2b or PUCCH format 3 can be adopted as the transmission scheme of the periodic CQI (Channel Quality Indication)/PMI (Precoding Matrix Indicator)/RI (Rank Indication) information.

Meanwhile, such information can be transmitted on channel resources configured at a higher layer according to the defined period.

In an LTE-A system, time domains or frequency domains can be bundled to decrease the number of ACK/NACK feedback bits.

(1) Time-domain bundling means that UE bundles the ACK/NACK feedback information corresponding to data packets received in several downlink sub-frames of feedback windows in a configured downlink carrier and acquires L bits of bundled ACK/NACK feedback information $b_0$, $b_1$, ... $b_{L-1}$ as shown in FIG. 4, wherein, N≥L≥2N, and N is the number of downlink carriers aggregated by UE. If the configured downlink carrier is in multiple-codeword transmission mode, UE should also perform spatial bundling on 2N-L configured downlink carriers, namely bundling the ACK/NACK feedback information of multiple-codeword received in an uplink sub-frame on the carrier. Feedback information states comprise ACK (correctly-received data packets), NACK (incorrectly-received data packets) and DTX (Discontinuous Transmission, indicating missed or unscheduled data packets). During bundling, UE can detect whether downlink data packets of the currently-configured downlink carrier have been missed in a feedback window or whether it receives any data packets on the currently-configured downlink carrier in a feedback window by using the DAI (Downlink Assignment Index), and then generate the DTX for such a downlink carrier as the bundled feedback information. If UE detects that no downlink data packets have been missed on such downlink carrier in the feedback window and the feedback information of at least a data packet received in downlink carrier is NACK, it is necessary to generate the NACK for the downlink carrier as the bundled feedback information. If UE detects that no downlink data packets have been missed on such downlink carrier in the feedback window and the feedback information of all data packets received on the downlink carrier is ACK, it is necessary to generate the ACK for the downlink carrier as the bundled feedback information.

To eliminate an inconsistent understanding of UE and base stations caused by data packet losses when bundling in time domains, UE can take the number of the last downlink sub-frame received in a feedback window or the total number of downlink sub-frames in a feedback window as $\lceil \log_2 M \rceil$ bits of assistant information, $\tilde{b}_0, \tilde{b}_1, \ldots \tilde{b}_{\lceil \log_2 M \rceil - 1}$ and cascade it with the bundled ACK/NACK feedback information to form $L + \lceil \log_2 M \rceil$ bits of feedback information for transmission. In this way, a base station can detect whether the finally-scheduled data packets have been missed or whether data packets in a feedback window have been missed by using the $\lceil \log_2 M \rceil$ bits of the rear information in the received feedback bits, so as to determine a proper retransmission decision and improve system transmission efficiency.

Frequency-domain bundling means that UE bundles the ACK/NACK information of data packets received on each configured downlink carrier in the current downlink sub-frame in a feedback window and performs spatial bundling if the configured downlink carrier is in multiple-codeword transmission mode. A schematic diagram of bundling frequency domains of the ACK/NACK feedback information in the prior art is shown in FIG. 5. To judge missed data packets, 2 bits of DAI in DL grant (DownLink grant) of an LTE TDD system can be used to indicate the total number of downlink data packets scheduled and transmitted on the configured downlink carriers in the same downlink sub-frame in a feedback window.

During bundling, if UE detects that downlink data packets on the configured downlink carrier in the current downlink sub-frame of the feedback window have been missed or UE does not receive downlink data packets in all the configured downlink carriers of the current downlink sub-frame, it is necessary to generate the DTX for the downlink sub-frame as the bundled feedback information. If UE detects that no downlink data packets have been missed on all the configured downlink carrier in current downlink subframe of the feedback window and the feedback information of at least a data packet received on multiple configured downlink carrier in current downlink subframe is NACK, it is necessary to generate the NACK for current downlink subframe as the bundled feedback information. If UE detects that no downlink data packets have been missed on all the configured downlink carrier in current downlink subframe of the feedback window and the feedback information of all data packets received on multiple configured downlink carrier in current downlink subframe is ACK, it is necessary to generate the ACK for current downlink subframe as the bundled feedback information.

In an LTE Rel-8 system, a base station can configure in a semi-static state whether UE supports the simultaneous transmission of ACK/NACK and periodic CQI/PMI/RI in a PUCCH through the parameter, simultaneousAckNackAndCQI. If the parameter is False, simultaneous transmission is not supported, that is to say, when ACK/NACK and periodic CQI/PMI/RI happened to be transmitted in the same uplink sub-frame through a PUCCH, UE will drop the periodic CQI/PMI/RI and only feed back ACK/NACK. If the parameter is True, simultaneous transmission is supported. At this time, ACK/NACK feedback bits indicate 1 bit of ACK/NACK information of a data packet when only the data packet is available or the number of ACK in the ACK/NACK feedback information of several scheduled data packets when they are available as shown in Table 2. Under the normal CP, PUCCH format 2a/2b is used to transmit periodic CQI/PMI/RI feedback bits and ACK/NACK feedback bits will be mapped in pilot frequency resources in the $2^{nd}$ column to be transmitted together with the periodic CQI/PMI/RI feedback bits. Under the extended CP, PUCCH format 2 is adopted to transmit periodic CQI/PMI/RI feedback bits and the combined code transmission will be performed on the cascaded ACK/NACK feedback bits after periodic CQI/PMI/RI feedback bits.

TABLE 2

Multi-ACK/NACK Feedback Information Mapping

| Number of ACK among multiple ($U_{DAI} + N_{SPS}$) ACK/NACK responses | b(0), b(1) |
|---|---|
| 0 or None (UE detects at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

In the procedure of realizing the objects of the present invention, at least the following problems existing in the current technologies were found:

In an LTE-A system, there may be a lot of ACK/NACK feedback information bits and 20 bits of information at most can be transmitted using PUCCH format 3, the mode of transmitting ACK/NACK and periodic CQI/PMI/RI simultaneously in an LTE Rel-8 is no longer applicable to the LTE-A system entirely.

At present, there is no solution for transmitting ACK/NACK and periodic CQI/PMI/RI simultaneously in multiple carriers in the prior art.

SUMMARY OF THE PRESENT INVENTION

The embodiments of the present invention provide the method and device for simultaneous transmission of ACK/NACK feedback information and periodic CQI/PMI/RI feedback bits to transmit them in an LTE-A system.

To achieve the aforementioned objective, on one hand, the embodiments of the present invention provide the method and device for simultaneous transmission of ACK/NACK feedback information and periodic CQI/PMI/RI feedback bits, comprising:

The terminal equipment receiving downlink data;

The terminal equipment generates K bits ACK/NACK feedback bits for the data in M downlink sub-frames on N configured downlink carriers, wherein, N≥1, M≥1, and the ACK/NACK feedback information of such data is transmitted in one uplink sub-frame;

The terminal equipment generates S bits periodic CQI/PMI/RI feedback bits;

The terminal equipment sends S bits periodic CQI/PMI/RI feedback bits and K bits ACK/NACK feedback bits simultaneously in the abovementioned uplink sub-frame using PUCCH format 3.

Besides, the embodiments of the present invention also provide the terminal equipment, comprising:

A receiving module receiving downlink data;

The first generation module generating K bits ACK/NACK feedback bits for the data in M downlink sub-frames on N configured downlink carriers, wherein, N≥1, M≥1, and the ACK/NACK feedback information of such data is transmitted in one uplink sub-frame;

The second generation module generating S bits periodic CQI/PMI/RI feedback bits;

A sending module sending S bits periodic CQI/PMI/RI feedback bits generated by the second generation module and K bits ACK/NACK feedback bits generated by the first generation module simultaneously in the abovementioned uplink sub-frame using PUCCH format 3.

Besides, the embodiments of the present invention provide the method and device for simultaneous transmission of ACK/NACK feedback information and periodic CQI/PMI/RI feedback bits, comprising:

A base station sends downlink data to the terminal equipment;

The base station receives S bits periodic CQI/PMI/RI feedback bits and K bits of ACK/NACK feedback information sent by the terminal equipment on the PUCCH format 3 channel resource(s), wherein, N≥1, M≥1, and the ACK/NACK feedback information of the data in M downlink sub-frames is transmitted in one uplink sub-frame;

Besides, the embodiments of the present invention also provide a base station, comprising:

A sending module sending downlink data to the terminal equipment;

A receiving module receiving S bits periodic CQI/PMI/RI feedback bits and K bits of ACK/NACK feedback information sent by the terminal equipment on the PUCCH format 3 channel resource(s), wherein, N≥1, M≥1, and the ACK/NACK feedback information of the data in M downlink sub-frames is transmitted in one uplink sub-frame;

Compared with the prior art, the embodiments of the present invention at least have the following advantages:

By way of using the technical solution of the embodiments of the present invention, the periodic CQI/PMI/RI feedback bits and ACK/NACK feedback information can be simultaneously transmitted in one uplink sub-frame using a PUCCH format 3 transmission 3 transmission scheme in an LTE-A system, thus avoiding the situation that the transmission of the periodic CQI/PMI/RI information needs to be abandoned when the ACK/NACK feedback information and the periodic CQI/PMI/RI information are transmitted simultaneously in one uplink sub-frame, improving the feedback efficiency of the uplink control information.

DETAILED DESCRIPTION OF THE EMBODIMENTS OF THE PRESENT INVENTION

As described in the Background of the Present Invention, in an LTE-A system, when a base station aggregates several downlink carriers for sending the data to users, UE will feed back the ACK/NACK feedback information corresponding to several downlink carriers and sub-frames in an uplink sub-frame. To facilitate the downlink scheduling, UE will periodically feed back the CSI (Channel State Information) comprising CQI/PMI/RI corresponding to several downlink carriers in an uplink sub-frame.

At present, there is no explicit solution for simultaneous transmission of several bits of ACK/NACK feedback information and several periodic CQI/PMI/RI feedback bits in an LTE-A system.

Based on the above reason, the embodiments of the present invention offer a method for simultaneous transmission of ACK/NACK feedback information and periodic CQI/PMI/RI feedback bits.

In an LTE-A system, if the terminal equipment is equipped with N (N≥1) downlink carriers, the technical solution proposed in the embodiments of the present invention can be applied when the terminal equipment supports the mode of simultaneous transmission of periodic CQI/PMI/RI feedback information and ACK/NACK feedback information in an uplink sub-frame in PUCCH.

Figure 1:
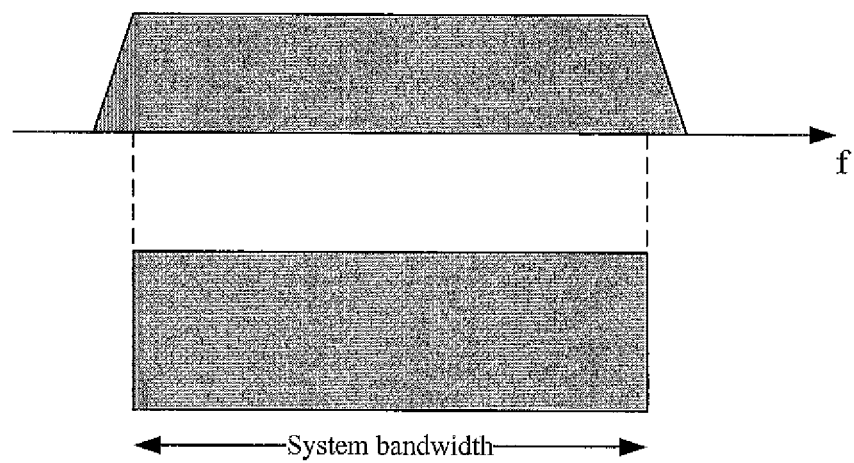
FIG. 1 is a schematic diagram of a single spectrum system in the prior art.
Figure 2:
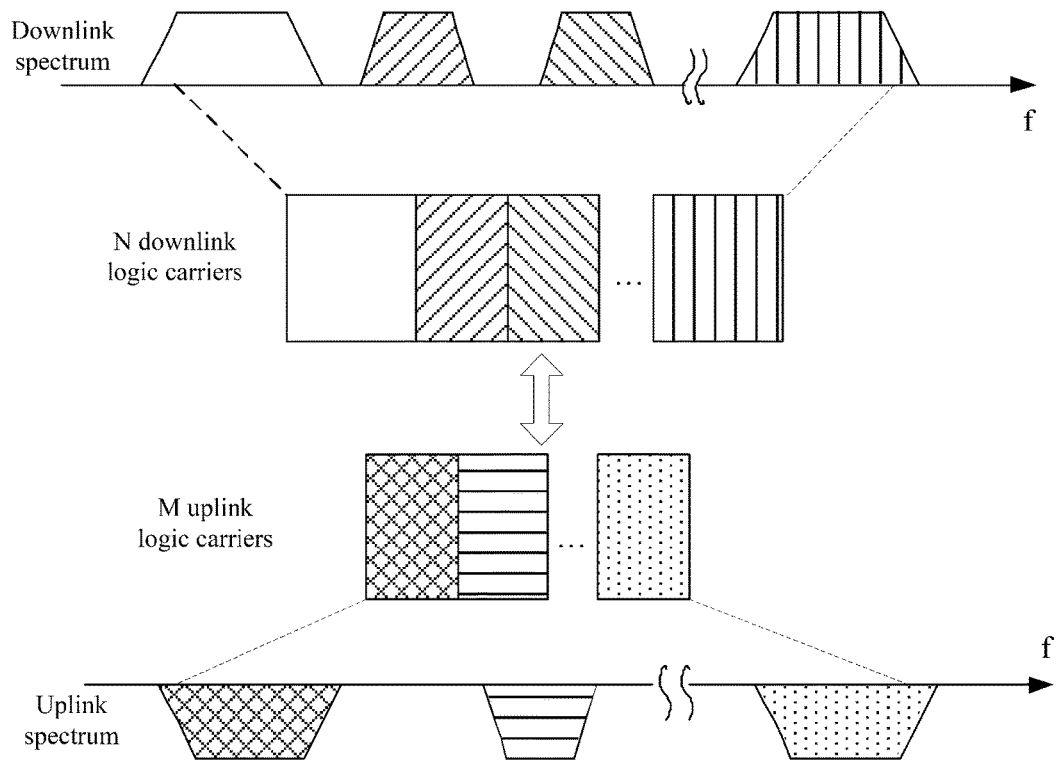
FIG. 2 is a schematic diagram of a spectrum aggregation system in the prior art.
Figure 3:
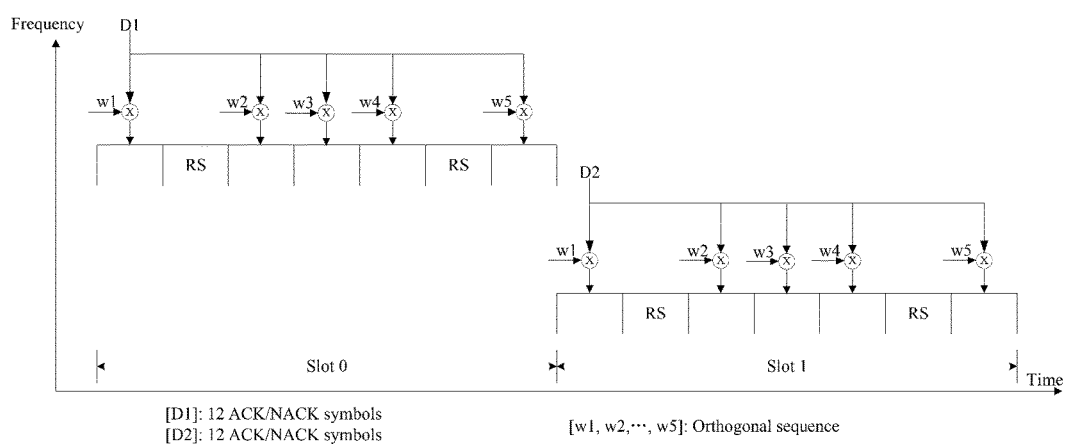
FIG. 3 is a transmission structural diagram of PUCCH format 3 under the conventional CP in the prior art.
Figure 4:
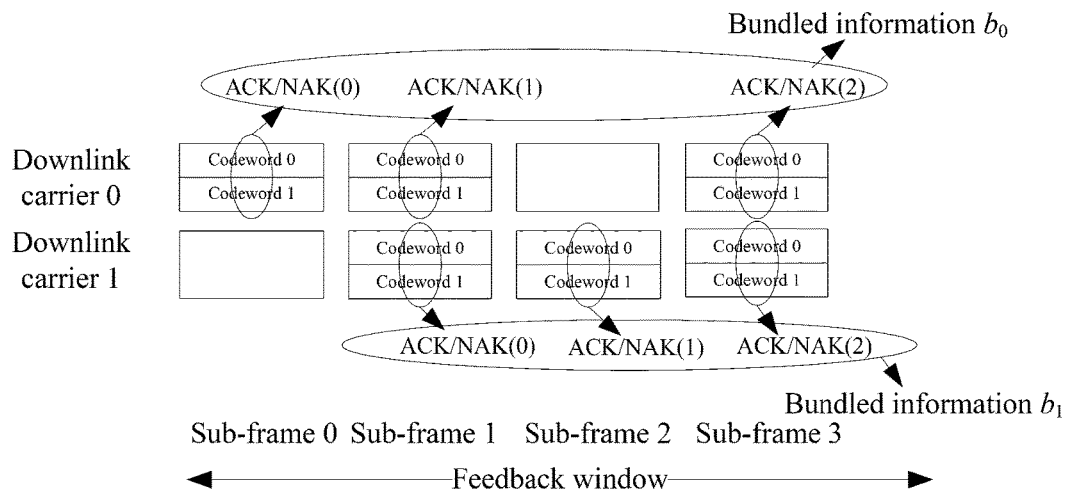
FIG. 4 is a schematic diagram for time domain bundling of the ACK/NACK feedback information in a TDD system in the prior art.
Figure 5:
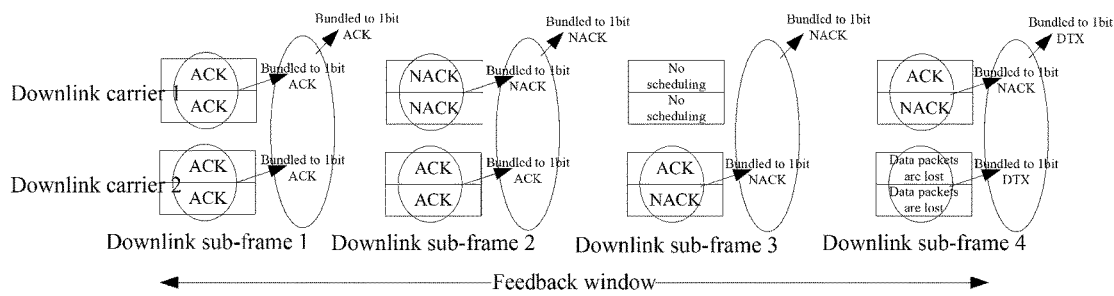
FIG. 5 is schematic diagram for time domain bundling of the ACK/NACK feedback information in the prior art.
Figure 6:
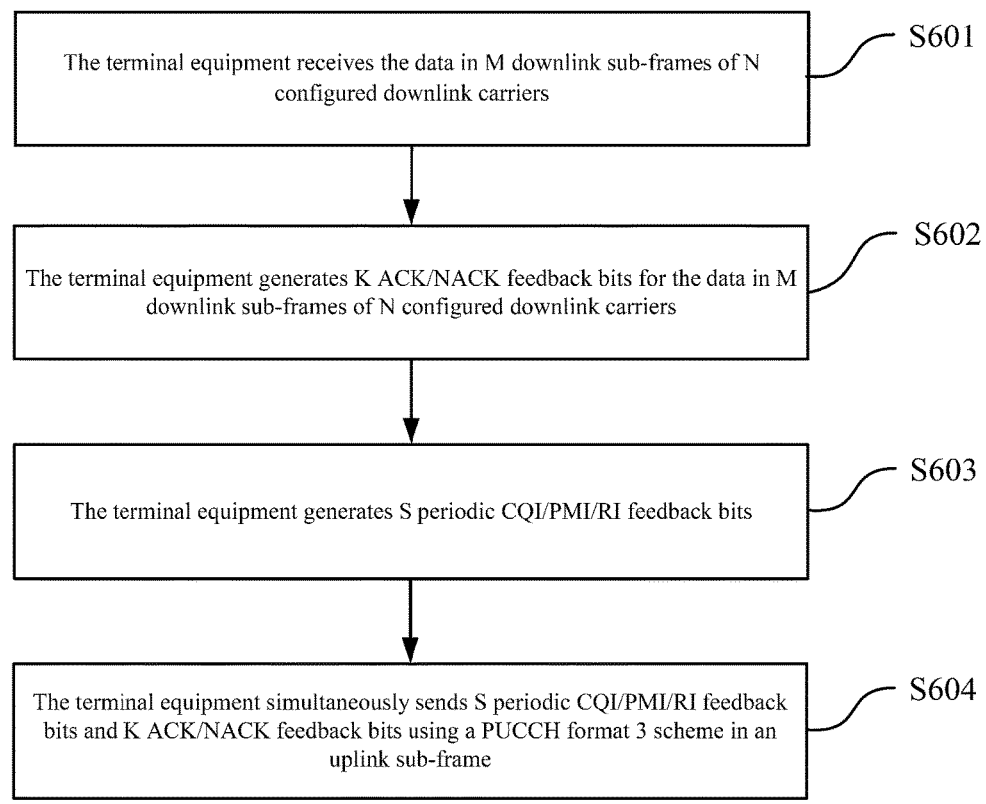
FIG. 6 is a flow diagram of the method for simultaneous transmission of ACK/NACK feedback information and periodic CQI/PMI/RI feedback bits proposed in the embodiments of the present invention.

FIG. 6 is a flow diagram of the method for simultaneous transmission of ACK/NACK feedback information and periodic CQI/PMI/RI feedback bits proposed in the embodiments of the present invention. The method comprises the followings:

Step 601, the terminal equipment receives the data.

Step 602, the terminal equipment generates K bits ACK/NACK feedback bits for the data in M downlink sub-frames on N configured downlink carriers, wherein, N≥1, M≥1, and the ACK/NACK feedback information of the data in M downlink sub-frames is transmitted in one uplink sub-frame;

For the step, the corresponding process comprising the 3 conditions below in actual application:

Condition I, the terminal equipment generates L bits ACK/NACK feedback bits for the data in M downlink sub-frames on N configured downlink carriers, and generates T bits of assistant information, wherein, K is the sum of L and T.

In the condition, there are two corresponding methods for generating L bits ACK/NACK feedback bits below:

Method I for generating feedback bits:

The terminal equipment generates 1 bit of ACK/NACK feedback information for each data packet received in M downlink sub-frames on N configured downlink carriers and 1 bit of NACK feedback information for the missed data packets;

The terminal equipment generating L bits ACK/NACK feedback bits by performing bundling across the NACK feedback information corresponding to the M downlink sub-frames on each downlink carrier of the N configured downlink carriers, wherein, L≥N.

Method II for generating feedback bits:

The terminal equipment generates 1 bit of ACK/NACK feedback information for each data packet received in M downlink sub-frames on N configured downlink carriers and 1 bit of NACK feedback information for the missed data packets;

The terminal equipment generates 1 bit ACK/NACK feedback bit by performing bundling across the NACK feedback information corresponding to M downlink sub-frames on all of the configured downlink carriers.

Besides, in the condition, there are three corresponding methods for generating T bits of assistant information below:

Method I for generating assistant information, comprising M states at least, wherein, M states are used to indicate the number, S (S≥1), of downlink sub-frames with a PDCCH received by the terminal equipment in M downlink sub-frames, and the PDCCH is used to transmit the downlink grant of PDSCH and/or is a PDCCH indicating the activation/release of semi-persistent PDSCH.

Method II for generating assistant information, comprising M states at least, wherein, M states are used to indicate the number, S (S≥1), of downlink sub-frames with a PDCCH received by the terminal equipment in M downlink sub-frames, one of the M states is used by multiplexing to indicate the condition that the terminal equipment does not receive any downlink sub-frames with PDCCH transmission (that is to say, the terminal equipment only receives downlink sub-frames without corresponding PDCCHs or does not receive any downlink sub-frames), and a PDCCH is used to transmit the downlink grant of PDSCH and/or is a PDCCH indicating the activation/release of semi-persistant PDSCH.

Method III for generating assistant information, comprising M+2 states at least, wherein M states are used to indicate the number, S (S≥1), of downlink sub-frames with a PDCCH received by the terminal equipment in M downlink sub-frames, an independent state different from the above M states is used to indicate the condition that the terminal equipment only receives downlink sub-frames without corresponding PDCCH transmission (namely only receiving a downlink sub-frame without corresponding PDCCHs transmitted by SPS PDSCH), an independent state different from the above M+1 states is used to indicate the condition that the terminal equipment does not receive any downlink sub-frames, and a PDCCH is used to transmit the downlink grant of PDSCH and/or is a PDCCH indicating the activation/release of semi-persistant PDSCH.

Method IV for generating assistant information, comprising M+1 states at least, wherein, M states are used to indicate the number, S (S≥1), of downlink sub-frames with a PDCCH received by the terminal equipment in M downlink sub-frames, an independent state different from the above M states is used to indicate the condition that the terminal equipment does not receive any downlink sub-frames with corresponding PDCCH transmission (that is to say, the terminal equipment only receives downlink sub-frames without corresponding PDCCHs or does not receive any downlink sub-frames), and a PDCCH is used to transmit the downlink grant of PDSCH and/or is a PDCCH indicating the activation/release of semi-persistent PDSCH.

It should be noted that the number, T of assistant information bits may be 0, that is to say, the terminal equipment only generates K=L bits of bundled ACK/NACK feedback information in accordance with the above methods I and II and does not need to further generate the assistant information.

Condition II, the terminal equipment generates 1 bit of ACK/NACK feedback information for data packets received on N configured downlink carriers in each downlink sub-frame of M downlink sub-frames and 1 bit of NACK feedback information for the missed data packets;

The terminal equipment generates M bits of ACK/NACK feedback information by performing bundling across the NACK feedback information corresponding to each downlink sub-frame of M downlink sub-frames on N configured downlink carriers, wherein, K=M.

Condition III, the terminal equipment generates K bits of ACK/NACK feedback information according to the number of data packets correctly received by itself in N configured downlink carriers and M downlink sub-frames.

In addition, there is also a method for generating feedback information. Condition IV, the terminal equipment generates L bits of ACK/NACK feedback information for each downlink carrier, wherein, the L bits of feedback information indicate the number used by received continuously and correctly on the current downlink carrier starting from the first scheduled sub-frame (namely the number of ACK as the feedback information starting from the first scheduled sub-frame, wherein, spatial bundling should be performed on the ACK/NACK feedback information with multiple-codeword). When the terminal equipment is equipped with N downlink carriers, it will generate K (the product of L and N) bundled ACK/NACK feedback bits for the data in M downlink sub-frames on N configured downlink carriers.

Step 603, the terminal equipment generates S bits periodic CQI/PMI/RI feedback bits.

Step 604, the terminal equipment sends S bits periodic CQI/PMI/RI feedback bits and K bits ACK/NACK feedback bits simultaneously in an uplink sub-frame using PUCCH format 3.

During implementation of the step S604, the PUCCH format 3 channel resource(s) applied by the terminal equipment comprise the following two:

(1) The PUCCH format 3 channel resource(s) for the terminal equipment to transmit periodic CQI/PMI/RI feedback bits.

Under this condition, such resources are a channel resource pre-configured by higher layer signalling.

(2) The PUCCH format 3 channel resource(s) for the terminal equipment to transmit ACK/NACK feedback bits.

Under this condition, such resource is one channel resource among those at least one channel resource(s) configured by higher layer signalling indicated by ACK/NACK resource indication bits in a PDCCH, wherein, the PDCCH is used for transmitting the downlink grant of the PDSCH on the downlink secondary carrier and/or downlink primary carriers, and DAI in the PDSCH is greater than 1;

Under this condition, if the terminal equipment receives two PDCCHs at least, ACK/NACK resource indication bits in two PDCCHs at least will be used to indicate the same channel resource.

It should be noted that, the aforementioned generation methods can be combined according to actual requirements. All technical solutions generated by such methods after combination should be taken as the protection scope of the embodiments of the present invention.

The aforementioned processes will be further explained below.

Figure 7:
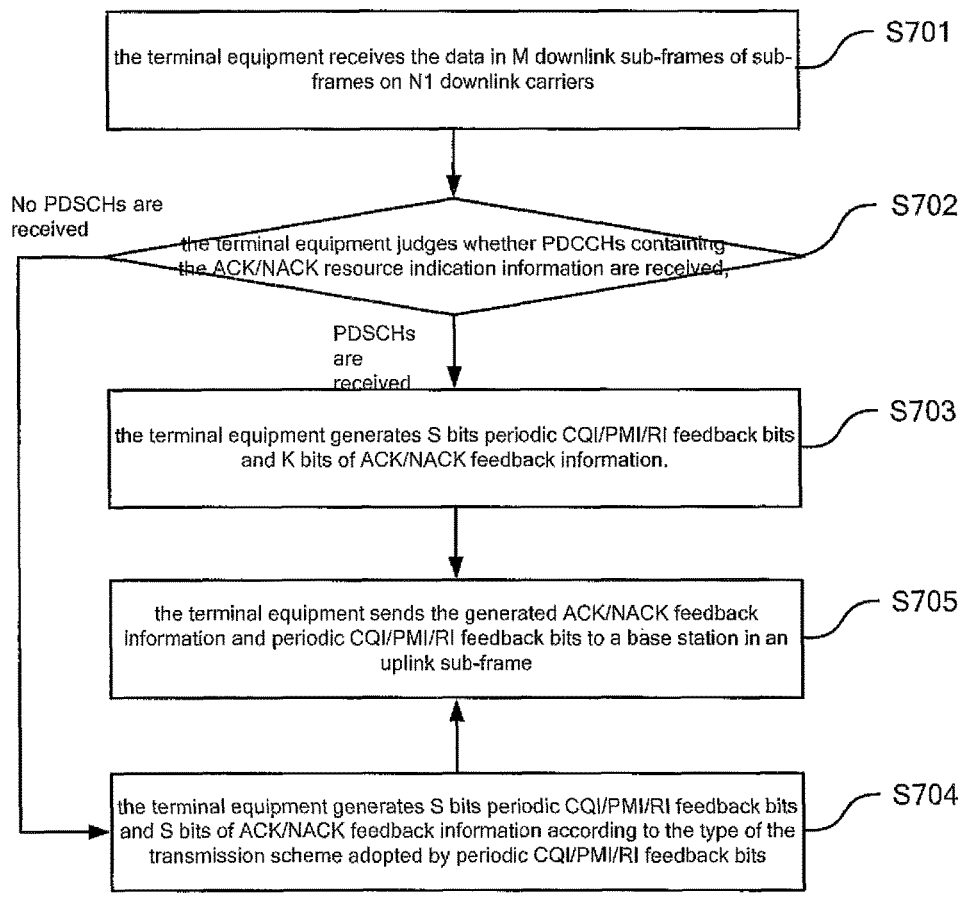
FIG. 7 is a flow diagram of the method for simultaneous transmission of ACK/NACK feedback information and periodic CQI/PMI/RI feedback bits under a specific application proposed in the embodiments of the present invention.

When the ACK/NACK feedback information is transmitted using PUCCH format 3 and the corresponding channel resources are dynamic indication (indicated through the ARI), a flow diagram of technical solutions proposed in the embodiments of the present invention is shown in FIG. 7, comprising the following steps:

Step 701, the terminal equipment receives the data in M downlink sub-frames on N1 downlink carriers.

Therein, N1≥N≥1, M≥1, and N is the number of configured downlink carriers. The ACK/NACK feedback information and periodic CQI/PMI/RI feedback bits of the data in M downlink sub-frames are transmitted simultaneously in one uplink sub-frame.

Step 702, the terminal equipment judges whether PDCCHs containing the ACK/NACK resource indication information are received, namely judging whether PDCCHs are received in each downlink secondary carrier among N configured downlink carriers and whether PDSCHs are received with the DAI greater than 1 scheduled by PDCCHs in downlink primary carriers.

That is to say, this step is mainly used to judge whether a terminal receives PDCCHs containing the resource indication information, wherein the PDCCHs are used for scheduling PDCCHs with the DAI greater than 1 transmitted by the data in downlink primary carriers and resource indication domains (namely the reuse of the TPC domains in DCI format used by PDCCHs) contained in PDCCHs transmitted by the data in downlink secondary carrier. PUCCH format 3 resources corresponding to the ACK/NACK transmission can be used only after receiving the PDCCHs.

Implement step 703 if the terminal equipment judges that one the PDCCH at least is received;

Otherwise, implement step 704.

Step 703, the terminal equipment generates S bits periodic CQI/PMI/RI feedback bits and K bits of ACK/NACK feedback information.

After finishing the processing in the step, implement step S705 next.

In the step, the terminal equipment feeds back S+K bits of information, wherein the information is comprised by cascading S bits of periodic CQI/PMI/RI feedback information, $a_0, a_1, \ldots a_{S-1}$ and K bits ACK/NACK feedback bits, $b_0, b_1, \ldots b_{K-1}$.

To be specific, the abovementioned K bits ACK/NACK feedback bits can be acquired by the following two methods:

In actual application, a preferred value of the aforementioned K is 4.

Method I, K bits ACK/NACK feedback bits are comprised of L bits of bundled ACK/NACK feedback information, $b_0, b_1, \ldots b_{L-1}$ and T bits of assistant information, $\tilde{b}_0, \tilde{b}_1, \ldots \tilde{b}_{T-1}$.

Therein, K is the sum of L and T, and M (1≤M≤4) is the number of downlink sub-frames for ACK/NAK feedback in an uplink sub-frame.

In the above process, L bits of bundled ACK/NACK feedback information, $b_0, b_1, \ldots b_{L-1}$ is acquired by the terminal equipment merging data packets received in M downlink sub-frames on each configured downlink carrier.

In actual application, L can be 2 or 3, while 2 is preferred.

The terminal equipment generates the NACK for downlink sub-frames which do not receive data packets or which lose such packets.

It should be noted that when downlink carriers configured by the terminal equipment are transmitted by multiple-codeword, it is necessary to perform spatial bundling on the ACK/NACK feedback information.

Besides, T bits of assistant information is the total number of downlink sub-frames of dynamic PDCCHs for transmitting the downlink grant of PDCCHs received by the terminal equipment in M downlink sub-frames, wherein, such dynamic PDCCHs can be the ones with corresponding PDSCHs and indicating SPS PDSCH release as shown in Table 3.

Therein, T can be fixed as 2, or $T=\lceil \log_2 M \rceil$.

TABLE 3

Schematic Mapping of Assistant information in Method I

| Total number of received downlink sub-frames of dynamic PDCCHs for transmitting the downlink grant of PDSCHs | $\tilde{b}_0, \tilde{b}_1$ |
|---|---|
| 1 | 0, 0 |
| 2 | 0, 1 |
| 3 | 1, 0 |
| 4 | 1, 1 |

According to the aforementioned descriptions, the technical solution in the above method I is the one generated after combining the method I for generating feedback bits and the method I for generating assistant information in the condition I in the abovementioned step S602.

Method II, K bits ACK/NACK feedback bit, $b_0, b_1, \ldots b_{K-1}$ are acquired by the terminal equipment merging the ACK/NACK feedback information of data packets received in several configured downlink carriers on each of M (M=K) downlink sub-frames.

Similar to the descriptions in method I, when the configured downlink carriers are transmitted by multiple-codeword, it is necessary to perform spatial bundling and the terminal equipment generates the NACK for downlink sub-frames on which data packets are not received or are missed.

In actual application, the terminal equipment sends S+K bits of information on the PUCCH format 3 channel resource(s) for transmitting the ACK/NACK, and the channel resource is one of several semi-static channel resources configured by higher layer signalling indicated by the ARI in a PDCCH, wherein, the PDCCH is transmitted on the downlink primary carrier and/or downlink secondary carrier and used for scheduling 1 downlink secondary carrier at least, and the ARI in several PDCCHs should be used to indicate the same ACK/NACK channel resource.

According to the aforementioned descriptions, the technical solution in the above method II is the one in the condition II of the aforementioned step 602.

Step 704, the terminal equipment generates S bits periodic CQI/PMI/RI feedback bits and S bits of ACK/NACK feedback information according to the type of the transmission scheme adopted by periodic CQI/PMI/RI feedback bits.

After finishing the processing in the step, implement step 705 next.

In the step, there are two conditions according to the difference between transmission scheme types adopted by periodic CQI/PMI/RI feedback bits:

Condition I, if the transmission scheme adopted by the periodic CQI/PMI/RI is PUCCH format 2/2a/2b, the terminal will feed back S bits periodic CQI/PMI/RI feedback bits, $a_0, a_1, \ldots a_{S-1}$ and 2 bits ACK/NACK feedback bits, $b_0, b_1$ simultaneously, wherein, $S \leq 11$.

Under this condition, 2 bits ACK/NACK feedback bits are the number of data packets correctly received by the terminal equipment in N downlink carriers and/or M downlink sub-frames, namely $b_0, b_1$ in Table 2;

To be specific, under the conventional CP, the terminal equipment transmits S bits periodic CQI/PMI/RI feedback bits using a PUCCH format 2a/2b transmission scheme and 2 bits ACK/NACK feedback bits, $b_0, b_1$ on the second pilot frequency.

Besides, under the extended CP, 2 bits ACK/NACK feedback bits, $b_0, b_1$ are cascaded after S bits periodic CQI/PMI/RI feedback bits and S+2 bits of information is transmitted by the terminal equipment using a PUCCH format 2 transmission scheme.

It should be noted that the terminal equipment sends the abovementioned S+2 bits of information on 1 channel resource of PUCCH format 2/2a/2b configured in a higher layer and semi-static manner.

Condition II, when the transmission scheme adopted by the periodic CQI/PMI/RI is PUCCH format 3, the terminal equipment will feed back S+K bits of information, which is comprised by cascading S bits of periodic CQI/PMI/RI feedback information, $a_0, a_1, \ldots a_{S-1}$ and K bits ACK/NACK feedback bits.

Therein, K bits ACK/NACK feedback bits can be acquired by the following methods:

Method I, similar to the method II in the abovementioned step S703, which will not be explained here again.

Method II, K bits ACK/NACK feedback bits indicate the number of data packets correctly received by the terminal equipment in M downlink sub-frames and N downlink carriers (namely the number of ACK).

For example, when K=4 as shown in Table 4, the number of the largest data packets without error case is 15, some states will be mapped in an overlapping manner in case of more than 15 data packets, such as 1 and 16 correctly-received data packets will be mapped in the same state.

TABLE 4

Schematic Mapping of Feedback Information in Method III

| The number of correctly-decoded data packets in M downlink sub-frames and N downlink carriers | $b_0, b_1, b_2, b_3$ |
|---|---|
| 0 (no data packets are received) or the terminal equipment detects missed data packets | 0, 0, 0, 0 |
| 1 | 0, 0, 0, 1 |
| 2 | 0, 0, 1, 0 |
| 3 | 0, 0, 1, 1 |

TABLE 4-continued

Schematic Mapping of Feedback Information in Method III

| The number of correctly-decoded data packets in M downlink sub-frames and N downlink carriers | $b_0, b_1, b_2, b_3$ |
|---|---|
| 4 | 0, 1, 0, 0 |
| 5 | 0, 1, 0, 1 |
| 6 | 0, 1, 1, 0 |
| 7 | 0, 1, 1, 1 |
| 8 | 1, 0, 0, 0 |
| 9 | 1, 0, 0, 1 |
| 10 | 1, 0, 1, 0 |
| 11 | 1, 0, 1, 1 |
| 12 | 1, 1, 0, 0 |
| 13 | 1, 1, 0, 1 |
| 14 | 1, 1, 1, 0 |
| 15 | 1, 1, 1, 1 |
| 16 | 0, 0, 0, 1 |
| ... | ... |

According to the aforementioned descriptions, the technical solution in the above method III is the one in the condition III of the aforementioned step S602.

Method IV, K bits ACK/NACK feedback bits, $b_0, b_1, \ldots b_{K-1}$ are comprised of L bits of bundled ACK/NACK feedback information, $b_0, b_1, \ldots b_{L-1}$ and T bits of assistant information, $\tilde{b}_0, \tilde{b}_1, \ldots \tilde{b}_{L-1}$, wherein, K is the sum of L and T.

Therein, M ($1 \leq M \leq 4$) is the number of downlink sub-frames for ACK/NAK feedback in an uplink sub-frame;

In the states of T bits of assistant information, PDSCHs indicating that the terminal equipment does not receive any corresponding PDCCHs or downlink sub-frames of PDCCHs indicating SPS PDSCH release (comprising that the terminal equipment only receives only one PDSCH of SPS without corresponding PDCCHs).

Several receiving states of the terminal equipment may correspond to one state of assistant information d the terminal equipment to its limited states. For example, when T=2 as shown in Table 5, the terminal equipment does not receive any PDSCHs without corresponding PDCCHs or downlink sub-frames of PDCCHs indicating SPS PDSCH release (that is to say, the terminal equipment only receives one PDSCH of SPS without corresponding PDCCHs and does not receive any downlink sub-frames) or the terminal equipment receives 4 PDSCHs with corresponding PDCCHs and downlink sub-frames (corresponding to the same assistant information, "00") of PDCCHs indicating SPS PDSCH release.

TABLE 5

Schematic Mapping of Feedback Information in Method IV

| Total number of received downlink sub-frames of dynamic PDCCHs for transmitting the downlink grant of PDSCHs | $\tilde{b}_0, \tilde{b}_1$ |
|---|---|
| 0 (no downlink sub-frames with PDCCHs are received) | 0, 0 |
| 1 | 0, 1 |
| 2 | 1, 0 |
| 3 | 1, 1 |
| 4 | 0, 0 |

L bits of bundled ACK/NACK feedback information $b_0, b_1, \ldots b_{L-1}$ are acquired by the terminal equipment merging the ACK/NACK feedback information of data packets received in M downlink sub-frames on each configured downlink carrier.

In actual application, L can be 2 or 3, while 2 is preferred.

The terminal equipment generates the NACK for downlink sub-frames which do not receive data packets or which lose such packets.

It should be noted that when downlink carriers configured by the terminal equipment are transmitted by multiple-codeword, it is necessary to perform spatial bundling on the ACK/NACK feedback information.

Besides, T bits of assistant information is the total number of downlink sub-frames of dynamic PDCCHs for transmitting the downlink grant of PDCCHs received by the terminal equipment in M downlink sub-frames, wherein, such dynamic PDCCHs can be the ones with corresponding PDSCHs and indicating SPS PDSCH release.

Therein, T can be fixed as 2, or $T=\lceil \log_2 M \rceil$.

According to the aforementioned descriptions, the technical solution in the above method IV is the one combining the method I for generating feedback bits and the method II for generating assistant information in the condition I of the aforementioned step S602.

Method V, K bits ACK/NACK feedback bits, $b_0, b_1, \ldots b_{K-1}$ are comprised of P bits of bundled ACK/NACK feedback information, $b_0, b_1, \ldots b_{P-1}$ and T+1 bits of assistant information, $\tilde{b}_0, \tilde{b}_1, \ldots \tilde{b}_T$. An independent state in the assistant information indicates that the terminal equipment does not receive any downlink sub-frames, while another state indicates that the terminal equipment does not receive any downlink sub-frames with PDCCHs.

For the assistant information generated in the method, an independent state in the assistant information indicates that the terminal equipment does not receive any downlink sub-frames, another state indicates that the terminal equipment only receives on the downlink sub-frame of PDSCHs of SPS without corresponding PDCCHs, and the rest successively indicate the number of PDSCHs with corresponding PDCCHs and downlink sub-frame of PDSCHs indicating SPS PDSCH release received by the terminal equipment. For example, when T+1=3 as shown in Table 6, "000" indicates that the terminal equipment does not receive any downlink sub-frames (namely DTX state of the terminal equipment), while "001" indicates that the terminal equipment does not receive any PDSCHs with corresponding PDCCHs and downlink sub-frame of PDSCHs indicating SPS PDSCH release. K is the sum of P, T and 1, and M ($1 \leq M \leq 4$) is the number of downlink sub-frames for the ACK/NAK feedback in an uplink sub-frame.

TABLE 6

Schematic Mapping of Assistant information in Method V

| Total number of received downlink sub-frames of dynamic PDCCHs for transmitting the downlink grant of PDSCHs | $\tilde{b}_0, \tilde{b}_1, \tilde{b}_2$ |
|---|---|
| 0-1 (no downlink sub-frames are received) | 0, 0, 0 |
| 0-2 (only 1 downlink sub-frame without corresponding PDCCHs is received) | 0, 0, 1 |
| 1 | 0, 1, 0 |
| 2 | 0, 1, 1 |
| 3 | 1, 0, 0 |
| 4 | 1, 0, 1 |
| ... | ... |

It should be noted that, P bits of bundled ACK/NACK feedback information, $b_0, b_1, \ldots b_{P-1}$ are acquired by the terminal equipment merging the ACK/NACK feedback information of data packets received in M downlink sub-frames on each configured downlink carrier, wherein $P \geq 1$ and that P=2 is preferred; or merging the ACK/NACK feedback information of data packets received in M downlink sub-frames on all the configured downlink carriers (namely Full bundling), wherein, P=1.

T+1 bits of assistant information are the total number of downlink sub-frames to of dynamic PDCCHs for transmitting the downlink grant of PDSCHs received by the terminal equipment in M downlink sub-frames, and such dynamic PDCCHs can be the ones with corresponding PDSCHs or indicating SPS PDSCH release, wherein, T can be fixed as 2, or $T=\lceil \log_2 M \rceil$;

According to the aforementioned descriptions, the technical solution in the above method V is the one generated after combining the method II for generating feedback bits and the method III for generating assistant information in the condition I of the abovementioned step S602.

Method VI, K bits ACK/NACK feedback bits, $b_0, b_1, \ldots b_{K-1}$ are comprised of P bits of bundled ACK/NACK feedback information, $b_0, b_1, \ldots b_{P-1}$ and T+1 bits of assistant information, $\tilde{b}_0, \tilde{b}_1, \ldots \tilde{b}_T$. An independent state in the assistant information indicates that the terminal equipment does not receive any downlink sub-frames or any downlink sub-frames with PDCCHs.

For the assistant information generated in the method, an independent state in the assistant information indicates that the terminal equipment does not receive any PDSCHs with corresponding PDCCHs or downlink sub-frames of PDCCHs indicating SPS PDSCH release (comprising that the terminal equipment only receives one downlink sub-frame of PDSCHs of SPS without corresponding PDCCHs and does not receive any downlink sub-frames), and the rest successively indicate the number of PDSCHs with corresponding PDCCHs and downlink sub-frame of PDSCHs indicating SPS PDSCH release received by the terminal equipment. For example, when T+1=3 as shown in Table 7, "000" indicates that the terminal equipment does not receive any downlink sub-frames (namely DTX state of the terminal equipment), any PDSCHs with corresponding PDCCHs or downlink sub-frame of PDSCHs indicating SPS PDSCH release. K is the sum of P, T and 1, and M ($1 \leq M \leq 4$) is the number of downlink sub-frames for the ACK/NAK feedback in an uplink sub-frame.

TABLE 7

Schematic Mapping of Assistant information in Method VI

| Total number of received downlink sub-frames of dynamic PDCCHs for transmitting the downlink grant of PDSCHs | $\tilde{b}_0, \tilde{b}_1, \tilde{b}_2$ |
|---|---|
| No downlink sub-frames with PDCCHs are received | 0, 0, 0 |
| 1 | 0, 0, 1 |
| 2 | 0, 1, 0 |
| 3 | 0, 1, 1 |
| 4 | 1, 0, 0 |

It should be noted that, P bits of bundled ACK/NACK feedback information, $b_0, b_1, \ldots b_{P-1}$ are acquired by the terminal equipment merging the ACK/NACK feedback information of data packets received in M downlink sub-frames on each configured downlink carrier, wherein $P \geq 1$, and that P=2 is preferred; or merging the ACK/NACK feedback information of data packets received in M downlink sub-frames on all the configured downlink carriers, wherein, P=1.

T+1 bits of assistant information are the total number of downlink sub-frames of dynamic PDCCHs for transmitting the downlink grant of PDSCHs received by the terminal equipment in M downlink sub-frames, and such dynamic PDCCHs can be the ones with corresponding PDSCHs or indicating SPS PDSCH release, wherein, T can be fixed as 2, or T=⌈log$_2$ M⌉;

According to the aforementioned descriptions, the technical solution in the above method VI is the one generated after combining the method II for generating feedback bits and the method IV for generating assistant information in the condition I of the abovementioned step S602.

Method VII, K bits ACK/NACK feedback bits, $b_0$, $b_1$, . . . $b_{K-1}$, comprise L bits of ACK/NACK feedback information generated by the terminal equipment for each downlink carrier, wherein, the L bits of information indicate the number used by received continuously and correctly in the current downlink carrier starting from the first scheduled sub-frame, namely the number of ACK as the feedback information starting from the first scheduled sub-frame.

It should be noted that spatial bundling should be performed on the ACK/NACK feedback information of multiple-codeword. When the terminal equipment is equipped with N downlink carriers, the K is the product of L and N, and 1≤L≤M, wherein, M (1≤M≤4) is the number of downlink sub-frames for the ACK/NAK feedback in an uplink sub-frame. Preferably, L=2 or L=3. For example, when L=2, in corresponding relations as shown in Table 8, the many-to-one mapping is available due to limited states of 2 bits of information. When T=2, the terminal equipment does not receive any downlink sub-frames (comprising that the terminal equipment receives wrong downlink sub-frames and does not receive any downlink sub-frames) or 4 consecutively correct downlink sub-frames which correspond to the same information state, "00". When L=3, the many-to-one mapping is unavailable in corresponding relations as shown in Table 9.

TABLE 8

Schematic Mapping of 2 Bits of Bundled Information in Method VII

| The number used by received continuously and correctly in the current downlink carrier starting from the first scheduled sub-frame | $\tilde{b}_0, \tilde{b}_1$ |
|---|---|
| 0 (no downlink sub-frames are received correctly) | 0, 0 |
| 1 | 0, 1 |
| 2 | 1, 0 |
| 3 | 1, 1 |
| 4 | 0, 0 |

TABLE 9

Schematic Mapping of 3 Bits of Bundled Information in Method VII

| The number used by received continuously and correctly in the current downlink carrier starting from the first scheduled sub-frame | $\tilde{b}_0, \tilde{b}_1, \tilde{b}_2$ |
|---|---|
| 0 (no downlink sub-frames are received correctly) | 0, 0, 0 |
| 1 | 0, 0, 1 |
| 2 | 0, 1, 0 |
| 3 | 0, 1, 1 |
| 4 | 1, 0, 0 |

According to the aforementioned descriptions, the technical solution in the above method VII is the one in the condition IV of the abovementioned step 602.

With the aforementioned methods, the terminal equipment sends the S+K bits of information configured in a higher layer and semi-static manner on channel resources of CQI/PMI/RI 的 PUCCH format 3 of the transmission period.

Step S705, the terminal equipment sends the generated ACK/NACK feedback information and periodic CQI/PMI/RI feedback bits to a base station in an uplink sub-frame.

It should be noted that, the seven methods given in the embodiments of the present invention is the combination of the methods proposed in the abovementioned step 602, which are only preferred ones, and other technical solutions can also be combined according to the actual requirements in actual application, which should also be taken as the protection scope of the present invention.

Correspondingly, at base station side, a base station receives ACK/NACK feedback information and periodic CQI/PMI/RI feedback bits simultaneously using the same rules mentioned in the above step S601 to step S604, and the corresponding processes will not be explained here again.

Figure 8:
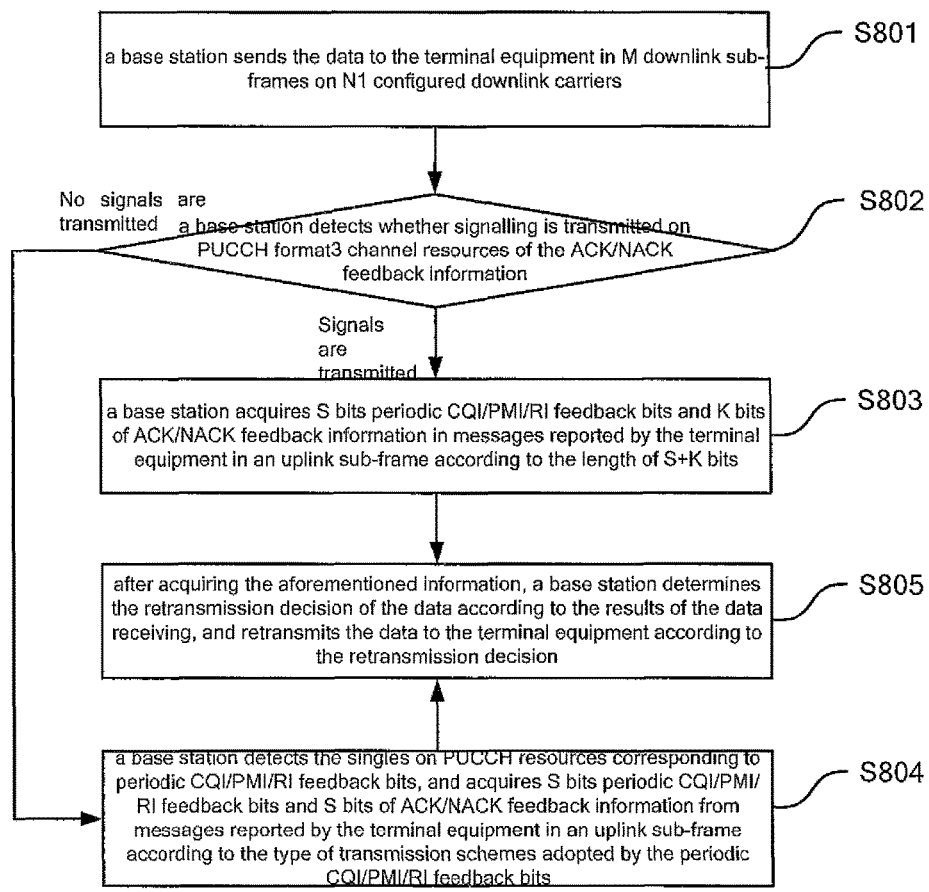
FIG. 8 is a flow diagram of the method for simultaneous transmission of ACK/NACK feedback information and periodic CQI/PMI/RI feedback bits under a specific application proposed in the embodiments of the present invention.

To be specific, corresponding to the processes in the above step S701 to step S705, corresponding processes at base station side are shown in FIG. 8, comprising the following steps:

Step S801, a base station sends the data to the terminal equipment in M downlink sub-frames on N1 configured downlink carriers.

Therein, 1≤N≤N1, M≥1, and N is the number of downlink carriers configured by the terminal equipment. ACK/NACK feedback information and periodic CQI/PMI/RI feedback bits of the data in M downlink sub-frames are transmitted simultaneously.

Step S802, a base station detects whether signalling is transmitted on PUCCH Format 3 channel resources of the ACK/NACK feedback information.

That is to say, the base station detects whether signalling is transmitted on the dynamically-Informed ACK/NACK PUCCH format 3 channel resources (the ARI indication of PDCCHs for scheduling downlink secondary carrier).

If signalling is transmitted, implement step 803;

If signalling is not transmitted, implement step 804.

Step 803, a base station acquires S bits periodic CQI/PMI/RI feedback bits and K bits of ACK/NACK feedback information in messages reported by the terminal equipment in an uplink sub-frame according to the length of S+K bits.

The process in the step is that a base station acquires S bits of periodic CQI/PMI/RI feedback information, $a_0$, $a_1$, . . . $a_{S-1}$ and K bits ACK/NACK feedback bits, $b_0$, $b_1$, . . . $b_{K-1}$ according to the decoding and demodulation of the length of S+K bits.

Wherein, the process in the step corresponding to the method I in step S703 comprises the followings:

When ACK is available in bundled bits, $b_0$, $b_1$, . . . $b_{L-1}$ among K bits ACK/NACK feedback bits, a base station judges the received data according to auxiliary bits, $\tilde{b}_0$, $\tilde{b}_1$, . . . $\tilde{b}_{T-1}$.

A base station can judge whether the number is the same as the total number of the actually-scheduled downlink sub-frames with dynamic PDCCHs through $\tilde{b}_0$, $\tilde{b}_1$, . . . $\tilde{b}_{T-1}$. If so, there are no downlink sub-frames have been missed on the terminal equipment, and the base station will multiplex according to bundled bits, $b_0$, $b_1$, . . . $b_{L-1}$ of each configured downlink carrier; if not, the base station judges that downlink sub-frames have been missed, but cannot determine which downlink sub-frame has been missed, so the base station will multiplex all the scheduled downlink sub-frames;

When all the bundled bits, $b_0$, $b_1$, . . . $b_{L-1}$ among K bits ACK/NACK feedback bits are NACK, a base station cannot further analyze auxiliary bits and multiplex all the scheduled downlink sub-frames or judges the received data according to auxiliary bits in accordance with the above step and determines a proper multiplexing scheme based on the reception and bundled bits, $b_0, b_1, \ldots b_{L-1}$.

Besides, the process in the step corresponding to the method II in step S703 comprises the followings:

A base station determines the multiplexing of each downlink sub-frame according to $b_0, b_1, \ldots b_{K-1}$ and multiplexes data packets scheduled on all the configured downlink carriers in a downlink sub-frame if the ACK/NACK feedback information corresponding to the downlink sub-frame is NACK.

Step 804, a base station detects the singles on PUCCH resources corresponding to periodic CQI/PMI/RI feedback bits, and acquires S bits periodic CQI/PMI/RI feedback bits and S bits of ACK/NACK feedback information from messages reported by the terminal equipment in an uplink sub-frame according to the type of transmission schemes adopted by the periodic CQI/PMI/RI feedback bits.

Firstly, a base station detects the signalling on PUCCH resources corresponding to periodic CQI/PMI/RI feedback bits, wherein, the following process comprises the following three conditions:

Condition I, under the conventional CP, the base station S bits periodic CQI/PMI/RI feedback bits on PUCCH format 2a/2b channel resources by decoding and demodulating according to the length of S bits and further detects 2 bits ACK/NACK feedback bits, $b_0, b_1$ on the pilot frequency in the second column.

When the number of correct data packets received by the terminal equipment indicated by $b_0, b_1$ is the same as that of actual data packets scheduled by the base station, the base station judges that the terminal equipment receives all the data correctly without multiplexing. If the two numbers are different, the base station will multiplex all the scheduled data packets when data packets have been missed or detected wrongly on the terminal equipment.

Condition II, under the extended CP, a base station acquires S bits periodic CQI/PMI/RI feedback bits, $a_0, a_1, \ldots a_{S-1}$ and 2 bits ACK/NACK feedback bits, $b_0, b_1$ on PUCCH format 2 channel resources by decoding and demodulating according to the length of S+2 bits.

Condition III, when the transmission scheme adopted by the periodic CQI/PMI/RI is PUCCH format 3, a base station acquires S bits periodic CQI/PMI/RI feedback bits, $a_0, a_1, \ldots a_{S-1}$ and K bits ACK/NACK feedback bits, $b_0, b_1, \ldots b_{K-1}$ (on PUCCH format 3 channel resources for transmitting the periodic CQI/PMI/RI) by decoding and demodulating according to the length of S+K bits.

Therein, specific processing methods in the step corresponding to the method in the above step S704:

Method II, similar to the method II in the above step S803, will not be explained here again.

Method III (corresponding the method III in step S704), when the number of data packets received correctly by the terminal equipment indicated by K bits, $b_0, b_1, \ldots b_{K-1}$ is the same as that of actual data packets transmitted by a base station, the base station judges that the terminal equipment receives all the data correctly without multiplexing. If the two numbers are different, the base station will multiplex all the scheduled data packets when data packets have been missed or detected wrongly on the terminal equipment.

Method IV (corresponding to the method IV in step S704), a base station judges the received data according to auxiliary bits, $\tilde{b}_0, \tilde{b}_1, \ldots \tilde{b}_{T-1}$.

When ACK is available in bundled bits, $b_0, b_1, \ldots b_{L-1}$ among K bits ACK/NACK feedback bits, a base station judges the received data according to auxiliary bits, $\tilde{b}_0, \tilde{b}_1, \ldots \tilde{b}_{T-1}$.

To be specific, a base station can judge whether the number is the same as the total number of the actually-scheduled downlink sub-frames with dynamic PDCCHs through $\tilde{b}_0, \tilde{b}_1, \ldots \tilde{b}_{T-1}$. If so, there are no downlink sub-frames have been missed on the terminal equipment, and the base station will multiplex according to bundled bits, $b_0, b_1, \ldots b_{L-1}$ of each configured downlink carrier; if not, the base station judges that downlink sub-frames have been missed, but cannot determine which downlink sub-frame has been missed, so the base station will multiplex all the scheduled downlink sub-frames. Specifically, when an error case is available, $\tilde{b}_0, \tilde{b}_1, \ldots \tilde{b}_{T-1}$ is "00", SPS PDSCH transmission is performed on the base station in downlink primary carriers, the base station schedules 4 downlink sub-frames with dynamic PDCCHs and the bundled feedback information, $b_0$ corresponding to PCC is ACK, the base station cannot judge whether all the 4 downlink sub-frames or SPS PDSCHs are correctly received on the downlink primary carrier and whether the downlink sub-frames have been missed.

Besides, when all the bundled bits, $b_0, b_1, \ldots b_{L-1}$ among K bits ACK/NACK feedback bits are NACK, a base station cannot further analyze auxiliary bits and multiplex all the scheduled downlink sub-frames or judges the received data according to auxiliary bits in accordance with the above step and determines a proper multiplexing scheme based on the reception and bundled bits, $b_0, b_1, \ldots b_{L-1}$. However, when the state indicated by $\tilde{b}_0, \tilde{b}_1, \ldots \tilde{b}_{T-1}$ is "00", the base station cannot distinguish whether which data packets have been missed. For example, if the base station schedules 4 downlink sub-frames actually and no SPS PDSCHs are available, the base station cannot distinguish whether the terminal equipment loses or wrongly receives all the scheduled downlink sub-frames. When SPS PDSCHs are available, the base station cannot distinguish whether the terminal equipment only receives the SPS PDSCHs or wrongly receives all the scheduled downlink sub-frames and whether all data packets have been missed, which will not affect the multiplexing.

Method V (corresponding to the method V in step S704), a base station judges the received data through auxiliary bits, $\tilde{b}_0, \tilde{b}_1, \ldots \tilde{b}_T$.

In the state indicated by $\tilde{b}_0, \tilde{b}_1, \ldots \tilde{b}_T$ that UE does not receive any downlink sub-frames (for example, "000"), if at least one downlink sub-frame (comprising PDSCHs of SPS) is transmitted on a base station, the base station judges that UE loses data packets and will multiplex all data packets. In the state indicated by $\tilde{b}_0, \tilde{b}_1, \ldots \tilde{b}_T$ that UE does not receive any downlink sub-frames of dynamic PDCCHs for transmitting the downlink grant of PDSCHs (for example, "001"), if SPS is transmitted on the base station in downlink primary carriers, the multiplexing of SPS data packets is determined according to $b_0$ among K bits, $b_0, b_1, \ldots b_{K-1}$. That is to say, when $b_0$ is ACK, the base station judges that SPS data packets are received correctly and will not multiplex them; when $b_0$ is NACK, the base station judges that SPS data packets are received wrongly and will multiplex them, and the base station schedules in other downlink sub-frames on downlink primary carriers and/or in downlink secondary carrier, the base station judges that data packets have been missed and will multiplex the scheduled data packets in all non-SPS downlink sub-frames. In the state indicated by $\tilde{b}_0, \tilde{b}_1, \ldots \tilde{b}_T$ that the number of downlink sub-frames received by UE of dynamic PDCCHs for transmitting the downlink grant of PDSCHs (for example, "010", "011", "100" and "101") is different from the number of actual downlink sub-frames with dynamic PDCCHs scheduled by the base station, the base station judges that UE loses data packets and will multiplex all downlink sub-frames. If SPS is not transmitted on the base station in downlink primary carriers, the base station judges missed data packets according to whether assistant information is fit for the number of actually-scheduled downlink sub-frames (for no SPS business is available at this time, the condition that UE does not receive any downlink sub-frames is equivalent to the one that UE does not receive any downlink sub-frames with PDCCHs, that is to say, the state, "000" is equivalent to the state, "001"). If not fit, the base station judges that UE loses data packets and will multiplex all the scheduled data packets; if fit, the base station determines the multiplexing of downlink sub-frames on each downlink carrier according to K bits, $b_0, b_1, \ldots b_{K-1}$.

Method VI (corresponding to the method VI in step 704), a base station judges the received data through auxiliary bits, $\tilde{b}_0, \tilde{b}_1, \ldots \tilde{b}_T$.

In the state indicated by $\tilde{b}_0, \tilde{b}_1, \ldots \tilde{b}_T$ that the terminal equipment does not receive any downlink sub-frames or UE does not receive any downlink sub-frames with PDCCHs (for example, "000"), if no SPS is transmitted on a base station in downlink primary carriers, the base station will judge to multiplex SPS data packets according to $b_0$ among K bits, $b_0, b_1, \ldots b_{K-1}$. That is to say, when $b_0$ is ACK, the base station judges that SPS data packets are received correctly and will not multiplex them; when $b_0$ is NACK and the base station schedules in other downlink sub-frames on downlink primary carriers and/or in downlink secondary carrier, the base station judges that data packets have been missed, but cannot judge whether SPS data packets have been missed or received wrongly, so it will multiplex all data packets. In the state indicated by $\tilde{b}_0, \tilde{b}_1, \ldots \tilde{b}_T$ that the number of downlink sub-frames received by the terminal equipment of dynamic PDCCHs for transmitting the downlink grant of PDSCHs (for example, "001", "010" "011" and "100") is different from the number of actual downlink sub-frames with dynamic PDCCHs scheduled by the base station, the base station judges that the terminal equipment loses data packets and will multiplex all downlink sub-frames. If SPS is not transmitted on the base station in downlink primary carriers, the base station judges missed data packets according to whether assistant information is fit for the number of actually-scheduled downlink sub-frames. If not fit, the base station judges that the terminal equipment loses data packets and will multiplex all the scheduled data packets; if fit, the base station determines the multiplexing of downlink sub-frames on each downlink carrier according to K bits, $b_0, b_1, \ldots b_{K-1}$.

Method VII (corresponding to the method V in step S704), a base station determines every L bits as a group among the received K bits of feedback information, $b_0, b_1, \ldots b_{K-1}$. That is to say, $b_0, b_1, \ldots b_{L-1}$ indicates the number of continuously and correctly received sub-frames starting from the first scheduled sub-frame corresponding to the first carrier, by which the base station can judge the number of correctly-transmitted sub-frames starting from the first scheduled sub-frame on the current carrier, based on this to acquire the number of correctly-transmitted sub-frames starting from the first scheduled sub-frame on each carrier and determines the number of incorrectly-transmitted sub-frames on each carrier.

It should be specially noted that in the above step, when a base station does not schedule the transmission of any downlink data in M downlink sub-frames and N downlink carriers, it can directly detect the step 2 and does not need to further analyze ACK/NACK feedback bits in the step.

When the base station schedules at least one downlink sub-frame on one downlink secondary carrier in M downlink sub-frames, the above steps 1 and 2 can be interchanged, that is to say, the base station can detect whether signalling is transmitted on PUCCH resources corresponding to the periodic CQI/PMI/RI in according with step 2 and then S+K bits of information if no signalling is transmitted in accordance with step 1.

Step 805, after acquiring the aforementioned information, a base station determines the retransmission decision of the data according to the results of the data receiving, and retransmits the data to the terminal equipment according to the retransmission decision.

In actual application, if CQI adopts PUCCH format 3 besides the above ones, namely configuring 1 PUCCH format 3 channel resource for transmitting the periodic CQI/PMI/RI in a semi-static state by higher layer signalling, the following transmission scheme will be adopted when feeding back uplink sub-frames of the periodic CQI/PMI/RI no matter whether PUCCH format 3 or PUCCH format 1 b with channel selection is adopted for feeding back the ACK/NACK:

Firstly, the terminal equipment always feeds back S+K bits of information, which are comprised by cascading S bits of periodic CQI/PMI/RI feedback information, $a_0, a_1, \ldots a_{S-1}$ and K bits ACK/NACK feedback bits, $b_0, b_1, \ldots b_{K-1}$.

Acquire K bits ACK/NACK feedback bits by any of the methods from II to VII in the aforementioned step S704. The terminal equipment sends S+K bits of information on the PUCCH format 3 channel resource(s) for transmitting the periodic CQI/PMI/RI configured at a higher layer.

Under this site, a base station detects signalling on the PUCCH format 3 channel resource(s) additionally configured by higher layer signalling.

Acquire S bits of periodic CQI/PMI/RI feedback information, $a_0, a_1, \ldots a_{S-1}$ and K bits ACK/NACK feedback bits, $b_0, b_1, \ldots b_{K-1}$ by decoding and demodulating according to the length of S+K bits, wherein, analyze K bits ACK/NACK feedback bits by any of the methods from II to VII in the aforementioned step S704 (corresponding to the methods from II to VII in the aforementioned step S804);

Specifically in the above step, when a base station does not schedule the transmission of any downlink data in M downlink sub-frames and N downlink carriers, it does not need to further analyze ACK/NACK feedback bits.

Besides, in the above condition II, PUCCH format 3 channel resources configured by higher layer signalling can be shared by several types of the terminal equipment so as to improve resource utilization ratio. A base station only needs to configure several types of the terminal equipment of the same additional PUCCH format 3 channel resource to feed back the periodic CQI/PMI/RI in different uplink sub-frames.

It should be noted that in the above embodiments, the methods for generating K bits of ACK/NACK feedback information in actual use for PUCCH format 3 resources corresponding to ACK/NACK or to CQI. In fact, when only one of the two kinds of resources is available, any of the seven methods can be applicable; when the two kinds of resources are available simultaneously, any of the seven methods can also be applicable. At this time, whether PUCCH format 3 resources used by the terminal equipment are the format 3 resources corresponding to ACK/NACK or CQI can be informed to the terminal equipment by higher layer signalling or PDCCH signalling, or preset for a base station and the terminal equipment.

It should further noted that the abovementioned PUCCH format 3 scheme comprises the improved schemes based on itself (for example the scheme for reducing the length, 4, 3, 2 and 1 of spread spectrum of format 3 time domains, etc.).

Compared with the prior art, the embodiments of the present invention at least have the following advantages:

By way of using the technical solution of the embodiments of the present invention, the periodic CQI/PMI/RI feedback bits and ACK/NACK feedback information can be simultaneously transmitted in one uplink sub-frame using a PUCCH format 3 transmission 3 transmission scheme in an LTE-A system, thus avoiding the situation that the transmission of the periodic CQI/PMI/RI information needs to be abandoned when the ACK/NACK feedback information and the periodic CQI/PMI/RI information are transmitted simultaneously in one uplink sub-frame, improving the feedback efficiency of the uplink control information.

Technical solutions proposed in the embodiments of the present invention will be described below in combination with specific application sites.

Embodiment 1

Figure 9A:
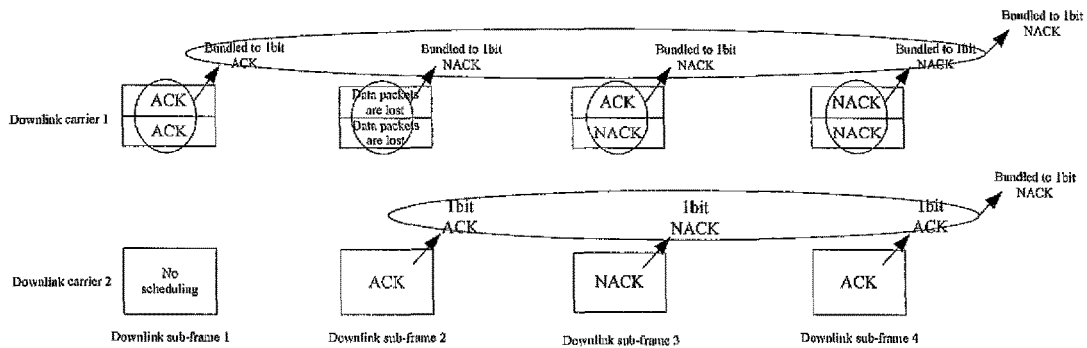
FIG. 9A and FIG. 9B are a flow diagram of the method for simultaneous transmission of ACK/NACK feedback information and periodic CQI/PMI/RI feedback bits under a specific application proposed in Embodiment 1 of the present invention.
Figure 9B:
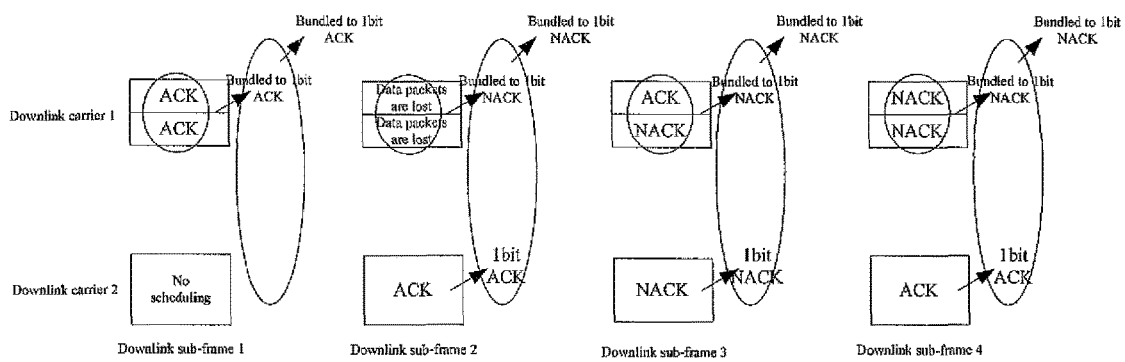

UE configures 2 downlink carriers, comprising downlink carrier 1, which is a downlink primary carrier and transmitted by multiple-codeword and downlink carrier 2 which is transmitted by single codeword. M=4, that is to say, UE should feed back the ACK/NACK feedback information of 4 downlink sub-frames on the current uplink sub-frame, a base station schedules 4 downlink sub-frames both from downlink carriers 1 and 2 as shown in FIG. 9A and FIG. 9B and the current uplink sub-frame is a periodic CQI feedback sub-frame, in which, CQI and ACK/NACK are transmitted simultaneously and ACK/NACK is transmitted using PUCCH format 3. The specific transmission process is as follows:

At UE side:

Receive data packets on the downlink secondary carrier to acquire PUCCH format 3 channel resources for transmitting the ACK/NACK indicated by ARI, send S+4 bits of cascading information using a PUCCH format 3 scheme on channel resources for transmitting the ACK/NACK with the methods proposed in step 701 to step 705, and adopt the following methods to acquire 4 ACK/NACK feedback bits:

Adopt the method I in the aforementioned step S703 as shown in FIG. 9A:

For M=4, namely requiring $\lceil \log_2 M \rceil=2$ bits of assistant information, L=2, that is to say, each downlink carrier corresponds to 1 bit of bundled feedback information. In downlink carrier 1, UE judges that downlink carrier 2 loses data packets and generates 1 bit of NACK as the feedback information of downlink carrier 1. In downlink carrier 2, UE judges that downlink carrier 1 does not perform scheduling and generates 1 bits of bundled NACK as the feedback information of downlink carrier 2 according to the data received in other downlink sub-frames, UE generates 2 bits of assistant information according to the number of the received downlink sub-frames with dynamic PDCCHs. For example, "11" among the corresponding relations in Table 3 indicates that UE receives 4 downlink sub-frames with dynamic PDCCHs;

Adopt the method II in the aforementioned step S703 as shown in FIG. 9B:

In downlink carrier 1, UE judges that downlink carrier 2 does not perform scheduling and generates 1 bit of ACK as the feedback information of downlink carrier 1 based on the data thereof. In downlink carrier 2, UE judges that downlink carrier 1 loses data packets and generates 1 bit of NACK as the feedback information of downlink carrier 1. In downlink carrier 3, UE generates 1 bit of NACK as the feedback information of downlink carrier 3 based on data packets received on 2 downlink carriers. In downlink carrier 4, UE generates 1 bit of NACK as the feedback information of downlink carrier 4 based on data packets received on 2 downlink carriers and acquires 4 bits of feedback information [ACK,NACK,NACK,NACK].

At base station side:

Firstly, detect signalling on 1 PDCCH format 3 channel resource for transmitting the ACK/NACK indicated by ARI of PDCCHs for scheduling downlink secondary carrier, perform decoding and demodulation according to the length of S+4 bits to acquire S bits of the periodic CQI/PMI/RI and 4 bits of ACK/NACK feedback information, and further analyze the information to determine whether to carry out multiplexing.

When adopting the method I in the above step S803, a base station judges that $\lceil \log_2 M \rceil=2$ bits of assistant information are required, that is to say, the former two bits among 4 bits of feedback information are the bundled ACK/NACK feedback information of downlink carriers 1 and 2 and the rest are assistant information. The base station judges that not all downlink sub-frames have been missed according to the assistant information, "11" and multiplexes according to the bundled ACK/NACK feedback information of each downlink carrier. For example, if 2 bits of bundled information are [NACK,NACK], the base station will multiplex all the scheduled downlink sub-frames on 2 downlink carriers.

When adopting the method I in the above step S803, a base station determines the retransmission decision of each downlink sub-frame according to 4 bits of the received feedback information. For example, if receiving 4 bits of [ACK,NACK,NACK,NACK], it will retransmit downlink sub-frames 2, 3, and 4 on 2 downlink carriers.

It should be noted that, in the above embodiment, the condition that PUCCH format 3 is adopted for CQI rather than ACK/NACK is also applicable. The difference is that format 3 transmission resources are PUCCH format 3 resources for transmitting CQI pre-configured by higher layer signalling to the terminal equipment.

Embodiment 2

Figure 10A:
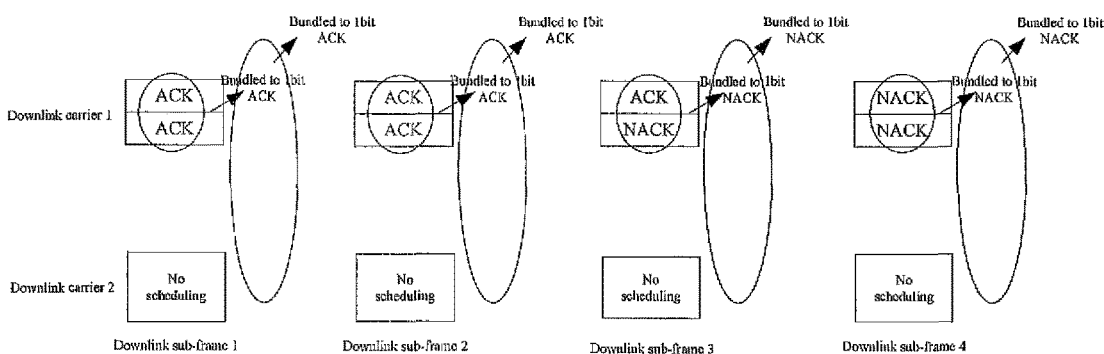
FIG. 10A to FIG. 10E are a flow diagram of the method for simultaneous transmission of ACK/NACK feedback information and periodic CQI/PMI/RI feedback bits under another specific application proposed in Embodiment 2 of the present invention.

UE configures 2 downlink carriers, comprising downlink carrier 1, which is a downlink primary carrier and transmitted by multiple-codeword and downlink carrier 2 which is transmitted by single codeword. M=4, that is to say, UE should feed back the ACK/NACK feedback information of 4 downlink sub-frames on the current uplink sub-frame, a base station schedules 4 downlink sub-frames both from downlink carriers 1 and 2 as shown in FIG. 10A to FIG. 10D and the current uplink sub-frame is a periodic CQI feedback sub-frame, in which, CQI and ACK/NACK are transmitted simultaneously and ACK/NACK is transmitted using PUCCH format 3 (namely higher layer signalling configuring 1 PUCCH format 3 channel resource for transmitting CQI to UE1 in advance). The specific transmission process is as follows:

At UE side:

Send CQI and ACK/NACK information simultaneously on the resources of CQI if data packets are not received on the downlink secondary carrier, adopt the methods in the condition 1 as PUCCH format 3 is adopted for CQI, send S+4 bits of cascading information of CQI and ACK/NACK using the scheme on PUCCH format 3 channel resources for transmitting CQI, and adopt the following methods to acquire 4 ACK/NACK feedback bits:

Adopt the method II in the above step S704 as shown in FIG. 10A:

In 4 downlink sub-frames, UE judges that downlink carrier 2 does not perform scheduling and generates 1 bit of feedback information for each downlink sub-frame based on the data of downlink carrier 1 to acquire 4 feedback bits, [ACK,ACK,NACK,NACK].

Figure 10B:
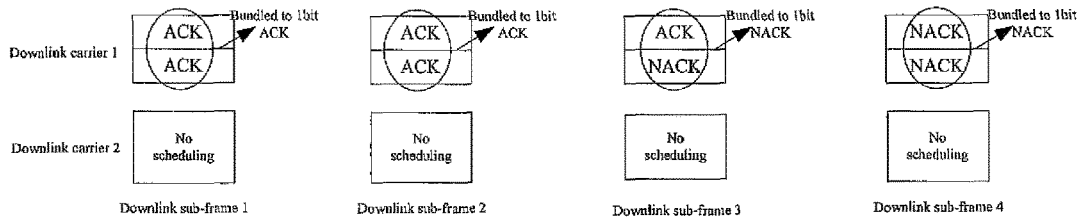

Adopt the method III in the above step S704 as shown in FIG. 10B:

UE generates 1 bit of feedback information for each downlink sub-frame of the data received on each downlink carrier and feeds back 4 bits of "0 0 0 0" as ACK/NACK feedback bits according to Table 4 as NACK is available.

Figure 10C:
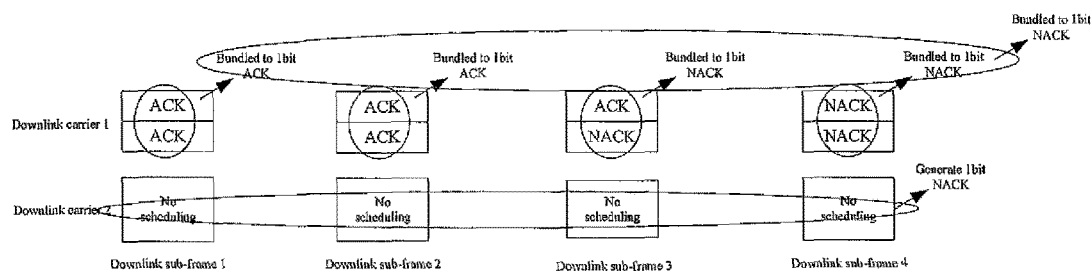

Adopt the method IV in the above step S704 as shown in FIG. 10C:

For M=4, $\lceil \log_2 M \rceil = 2$ bits of assistant information are required. In 4 downlink sub-frames, UE judges that downlink carrier 2 does not conduct scheduling and generates 1 bit of NACK as the feedback information; generates 1 bit of NACK as the feedback information based on the data thereof; UE generates 2 bits of assistant information according to the number of the received downlink sub-frames with dynamic PDCCHs. For example, "00" among the corresponding relations in Table 5 indicates that UE receives 4 downlink sub-frames with dynamic PDCCHs.

Figure 10D:
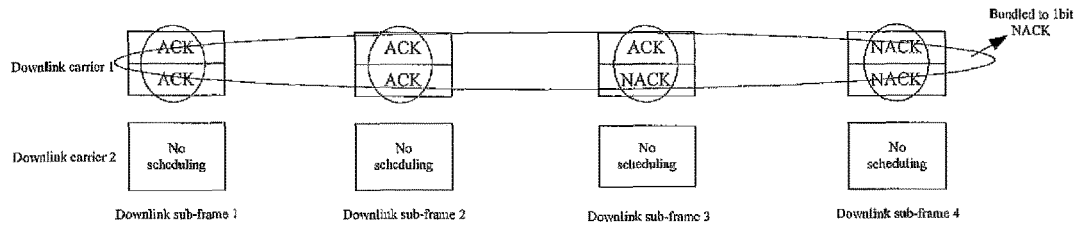

Adopt the method V in the above step S704 as shown in FIG. 10D:

For M=4, $\lceil \log_2 M \rceil + = 3$ bits of assistant information are required. UE judges that downlink carrier 2 does not conduct scheduling according to a frequency domain, DAI and performs full bundling on the feedback information of all data packets received on 2 downlink carriers to generate 1 bit of NACK as the is bundled feedback information. UE generates 3 bits of assistant information according to the number of the received downlink sub-frames with dynamic PDCCHs. For example, "1 0 1" among the corresponding relations in Table 6 indicates that UE receives 4 downlink sub-frames with dynamic PDCCHs.

Adopt the method VI in the above step 704 as shown in FIG. 10D:

For M=4, $\lceil \log_2 M \rceil + 1 = 3$ bits of assistant information are required. UE judges that downlink carrier 2 does not conduct scheduling according to a frequency domain, DAI and performs full bundling on the feedback information of all data packets received on 2 downlink carriers to generate 1 bit of NACK as the bundled feedback information. UE generates 3 bits of assistant information according to the number of the received downlink sub-frames with dynamic PDCCHs. For example, "1 0 0" among the corresponding relations in Table 7 indicates that UE receives 4 downlink sub-frames with dynamic PDCCHs.

Figure 10E:
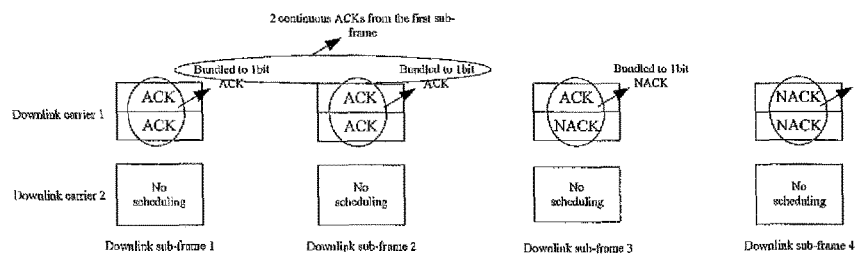

Adopt the method VII in the above step S704 as shown in FIG. 10E:

2 bits of bundled ACK/NACK feedback information generated by each downlink carrier of UE indicate the number of continuously and correctly received sub-frames starting from the first scheduled sub-frame on downlink carrier. For the carrier 1, after spatial bundling on the feedback information with multiple-codeword in each sub-frame, if the first two sub-frames are received correctly and the third sub-frame starts to be received incorrectly, UE determines that 2 sub-frames starting from the first scheduled sub-frame on downlink carrier 1 are received continuously and correctly and that no data are received on downlink carrier 1, and generates L=2 bits of bundled information, "1 0" and "0 0" for downlink carriers 1 and 2 respectively according to Table 8 to acquire 4 bits of ACK/NACK feedback information, "1 0 0 0".

At base station side:

As a base station only schedules the data in downlink primary carriers, it can detect signalling on PUCCH format 3 channel resources for transmitting CQI in accordance with the above step S704 and perform decoding & demodulation according to the length of S+4 bits to acquire S bits of the periodic CQI/PMI/RI and 4 bits of feedback information.

When the method II in the above step S804 is adopted:

A base station determines the retransmission decision of each downlink sub-frame according to 4 bits of the received information and will retransmit downlink sub-frames 3 and 4 if the 4 bits of information are [ACK,ACK,NACK, NACK].

When the method III in the above step S804 is adopted:

A base station judges missed data packets according to whether the number of ACK indicated by 4 bits of feedback information received is the same as the number of actually-scheduled data packets so as to determine a multiplexing scheme. If the 4 bits of information received is "0 0 0 0", the base station judges that UE loses all data packets or receives some data packets incorrectly so as to multiplex all downlink sub-frames.

When the method IV in the above step S804 is adopted:

A base station judges that $\lceil \log_2 M \rceil = 2$ bits of assistant information are required, that is to say, the first two bits among 4 bits of feedback information are the bundled ACK/NACK feedback information of downlink carriers 1 and 2, and the rest are assistant information. For 2 bits of bundled feedback information are [NACK,NACK], the base station does not need to further judge whether UE loses downlink sub-frames according to the assistant information, "00" and then multiplexes all downlink sub-frames.

When the method V in the above step S804 is adopted:

A base station judges that $\lceil \log_2 M \rceil = 2$ bits of assistant information are required, that is to say, the first one bit among 4 bits of feedback information is the bundled ACK/NACK feedback information of all data packets on downlink carriers 1 and 2, and the rest are assistant information. For 1 bit of bundled feedback information is [NACK, NACK], the base station does not need to further judge whether UE loses downlink sub-frames according to the assistant information, "00" and then multiplexes all downlink sub-frames; or it can further judge whether UE loses data packets according to the assistant information, "1 0 1" and then adopt a proper scheme to multiplex all downlink sub-frames.

When the method VI in the above step S804 is adopted:

A base station judges that $\lceil \log_2 M \rceil = 2$ bits of assistant information are required, that is to say, the first one bit among 4 bits of feedback information is the bundled ACK/NACK feedback information of all data packets on downlink carriers 1 and 2, and the rest are assistant information. For 1 bit of bundled feedback information is [NACK, NACK], the base station does not need to further judge whether UE loses downlink sub-frames according to the assistant information, and then multiplexes all downlink sub-frames; or it can further judge whether UE loses data packets according to the assistant information, "1 0 0" and then adopt a proper scheme to multiplex all downlink sub-frames.

When the method VII in the above step S804 is adopted:

Determine that the first two bits, "00" among the received 4 bits of ACK/NACK information, "1 0 0 0" indicate the number of continuously and correctly received sub-frames starting from the first scheduled sub-frame on downlink carrier 1, and the rest, "0 0" indicate the number of continuously and correctly received sub-frames starting from the first scheduled sub-frame on downlink carrier 2. Meanwhile, according to Table 8, determine that the number of continuously and correctly received sub-frames starting from the first scheduled sub-frame on downlink carrier 1 is 2, namely determining that the first 2 sub-frames are received correctly and the rest 2 should be transmitted. For "0 0" is in many-to-one state, a base station needs to further determine the meanings. In consideration that the base station does not schedule any data on downlink carrier 2, it can determine "0 0" indicates that UE does not receive any data on it.

It should be noted that, in the above embodiment, the condition that PUCCH format 3 is adopted for ACK/NACK rather than CQI is also applicable. The difference is that format 3 transmission resources are PUCCH format 3 resources for transmitting ACK/NACK pre-configured by higher layer signalling to the terminal equipment or one of format 3 resources pre-configured by higher layer signalling indicated by resource indication domains in PDCCHs.

Embodiment 3

UE configures 2 downlink carriers, comprising downlink carrier 1, which is a downlink primary carrier and transmitted by multiple-codeword and downlink carrier 2 which is transmitted by single codeword. M=3, that is to say, UE should feed back the ACK/NACK feedback information of 3 downlink sub-frames on the current uplink sub-frame, a base station schedules 1 downlink sub-frames both from downlink carriers 1 and 2 (but downlink sub-frame 3 has been missed) as shown in FIG. 11A to FIG. 11D and the current uplink sub-frame is a periodic CQI feedback sub-frame, in which, CQI and ACK/NACK are transmitted simultaneously and ACK/NACK is transmitted using PUCCH format 3 (namely higher layer signalling configuring 1 PUCCH format 3 channel resource for transmitting CQI to UE in advance). The specific transmission process is as follows:

UE side:

For PUCCH format 3 is adopted for CQI, CQI will adopt the method corresponding to the scheme, that is to say, UE sends S+4 bits of cascading information of CQI and ACK/NACK always on PUCCH format 3 channel resources for transmitting CQI using the scheme.

Figure 11A:
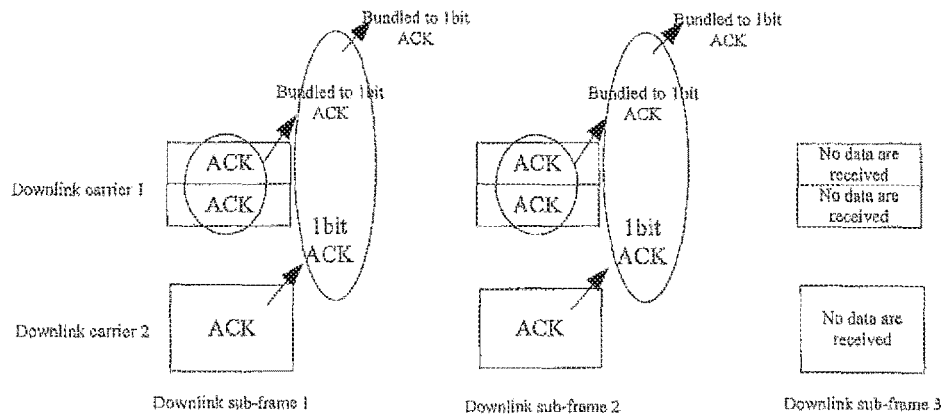
FIG. 11A to FIG. 11D are a flow diagram of the method for simultaneous transmission of ACK/NACK feedback information and periodic CQI/PMI/RI feedback bits under another specific application proposed in Embodiment 3 of the present invention.

Therein, 4 ACK/NACK feedback bits are acquired with the following methods:

Adopt the method II in the above step S704 as shown in FIG. 11A:

UE only receives the data in the first 2 downlink sub-frames and generates 1 bit of ACK as the feedback information of downlink sub-frames 1 and 2 based on the received data. Meanwhile, UE generates 1 bit of ACK as the feedback information of downlink sub-frame 3 to generate 3 feedback bits, [ACK,ACK,NACK].

Figure 11B:
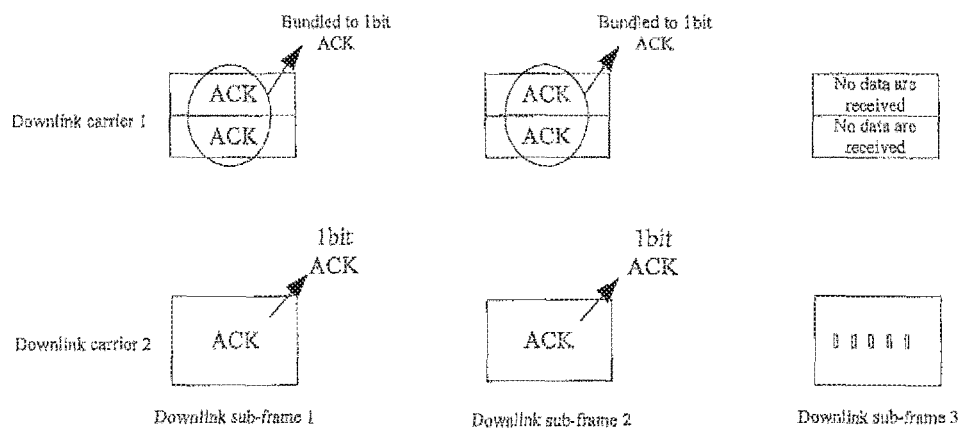

Adopt the method III in the above step 704 as shown in FIG. 11B:

UE generates 1 bit of feedback information for each downlink sub-frame of the data received on each downlink carrier and feeds back 4 bits of "0 1 0 0" as ACK/NACK feedback bits according to Table 4 for there are 4 ACKs and no NACKs.

Figure 11C:
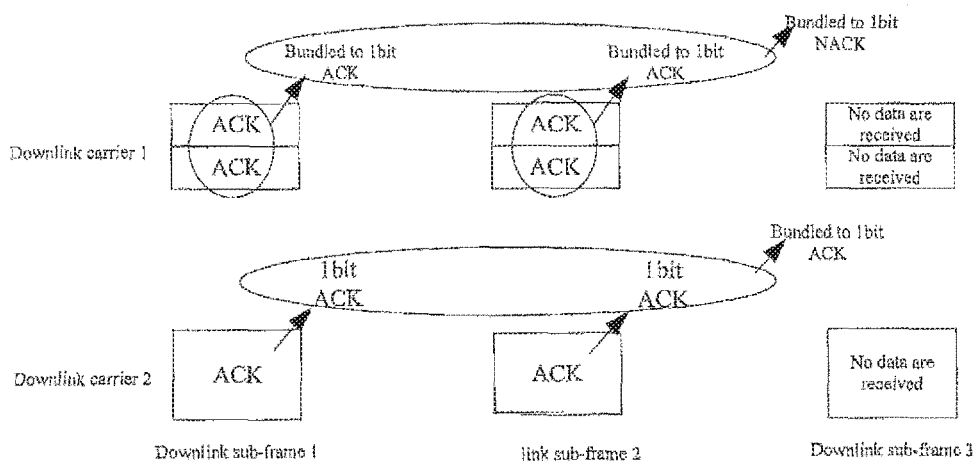

Adopt the method IV in the above step S704 as shown in FIG. 11C:

For M=4, $\lceil \log_2 M \rceil=2$ bits of assistant information are required. UE generates 1 bit of ACK respectively as the feedback information of downlink carriers 1 and 2 based on the data received on each downlink carrier. And 2 bits of assistant information according to the number of received downlink sub-frames with dynamic PDCCHs. For example, "10" among the corresponding relations in Table 5 indicates that UE receives 2 downlink sub-frames with dynamic PDCCHs.

Figure 11D:
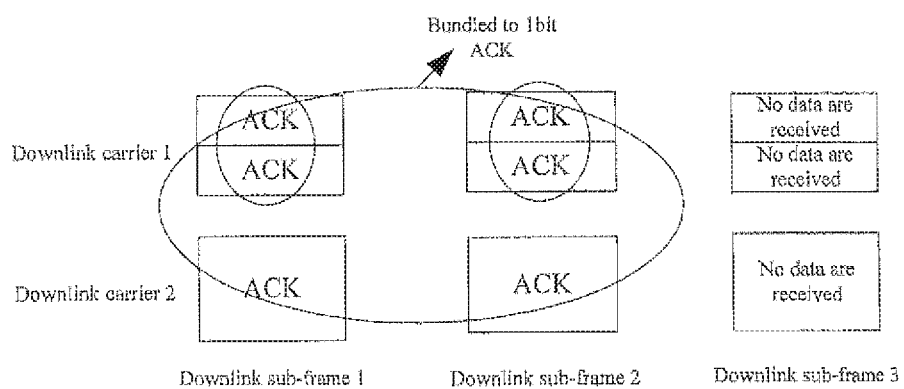

Adopt the method V in the above step S704 as shown in FIG. 11D:

For M=4, $\lceil \log_2 M \rceil+1=3$ bits of assistant information are required. UE performs full bundling according to the feedback information of all data packets received on 2 downlink carriers to generate 1 bit of ACK as the bundled feedback information. Meanwhile, it generates 3 bits of assistant information according to the number of received downlink sub-frames with dynamic PDCCHs. For example, "0 1 1" among the corresponding relations in Table 6 indicates that UE receives 2 downlink sub-frames with dynamic PDCCHs.

Adopt the method VI in the above step S704 as shown in FIG. 11D:

For M=4, $\lceil \log_2 M \rceil+1=3$ bits of assistant information are required. UE performs full bundling according to the feedback information of all data packets received on 2 downlink carriers to generate 1 bit of ACK as the bundled feedback information. Meanwhile, it generates 3 bits of assistant information according to the number of received downlink sub-frames with dynamic PDCCHs. For example, "0 1 0" among the corresponding relations in Table 6 indicates that UE receives 2 downlink sub-frames with dynamic PDCCHs.

Base station side:

A base station always detects signalling on PUCCH format 3 channel resources for transmitting a CQI, and performs decoding and demodulation according to the length of S+4 bits to generate S bits of the periodic CQI/PMI/RI and 4 bits of feedback information.

When the method II in the above step 804 is adopted:

A base station determines the retransmission decision of each downlink sub-frame according to the received 3 bits of feedback information and retransmits the downlink sub-frame 3 if the 3 bits of information are [ACK,ACK,NACK].

When the method III in the above step S804 is adopted:

A base station judges missed data packets according to whether the number of ACK indicated by the received 4 bits of feedback information is the same as the number of actually-scheduled data packets so as to determine a multiplexing scheme. If the received 4 bits of feedback information are "0 1 0 0" which indicate that 4 data packets are received correctly, but the base station schedules 6 data packets actually, then the base station judges that UE loses some data packets and then multiplexes all downlink sub-frames.

When the method IV in the above step S804 is adopted:

A base station judges that $\lceil \log_2 M \rceil=2$ bits of assistant information are required, that is to say, the first two bits among 4 bits of feedback information are the bundled ACK/NACK feedback information of downlink carriers 1 and 2, while the rest are assistant information. For the bundled 2 bits of feedback information are [ACK,ACK], the base station needs to further judge whether UE loses downlink sub-frames according to the assistant information. "10", the assistant information, indicates that 2 downlink sub-frames with dynamic PDCCHs are received, but the base station schedules 3 downlink sub-frames actually. Thus the bases station judges that UE loses a data packet and then multiplexes all downlink sub-frames.

When the method V in the above step S804 is adopted:

A base station judges that $\lceil \log_2 M \rceil + 1 = 3$ bits of assistant information are required, that is to say, the first one bit among 4 bits of feedback information is the bundled ACK/NACK feedback information of downlink carriers 1 and 2, while the rest are assistant information. For the bundled 1 bit of feedback information is ACK, the base station needs to further judge whether UE loses downlink sub-frames according to the assistant information. "0 1 1", the assistant information, indicates that 2 downlink sub-frames with dynamic PDCCHs are received, but the base station schedules 3 downlink sub-frames actually. Thus the bases station judges that UE loses a data packet and then multiplexes all downlink sub-frames.

When the method VI in the above step S804 is adopted:

A base station judges that $\lceil \log_2 M \rceil + 1 = 3$ bits of assistant information are required, that is to say, the first one bit among 4 bits of feedback information is the bundled ACK/NACK feedback information of downlink carriers 1 and 2, while the rest are assistant information. For the bundled 1 bit of feedback is information is ACK, the base station needs to further judge whether UE loses downlink sub-frames according to the assistant information. "0 1 0", the assistant information, indicates that 2 downlink sub-frames with dynamic PDCCHs are received, but the base station schedules 3 downlink sub-frames actually. Thus the bases station judges that UE loses a data packet and then multiplexes all downlink sub-frames.

It should be noted that, in the above embodiment, the condition that PUCCH format 3 is adopted for ACK/NACK rather than CQI is also applicable. The difference is that format 3 transmission resources are PUCCH format 3 resources for transmitting ACK/NACK pre-configured by higher layer signalling to the terminal equipment or one of format 3 resources pre-configured by higher layer signalling indicated by resource indication domains in PDCCHs.

Compared with the prior art, the embodiments of the present invention at least have the following advantages:

By way of using the technical solution of the embodiments of the present invention, the periodic CQI/PMI/RI feedback bits and ACK/NACK feedback information can be simultaneously transmitted in one uplink sub-frame using a PUCCH format 3 transmission scheme in an LTE-A system, thus avoiding the situation that the transmission of the periodic CQI/PMI/RI information needs to be abandoned when the ACK/NACK feedback information and the periodic CQI/PMI/RI information are transmitted simultaneously in one uplink sub-frame, improving the feedback efficiency of the uplink control information.

Figure 12:
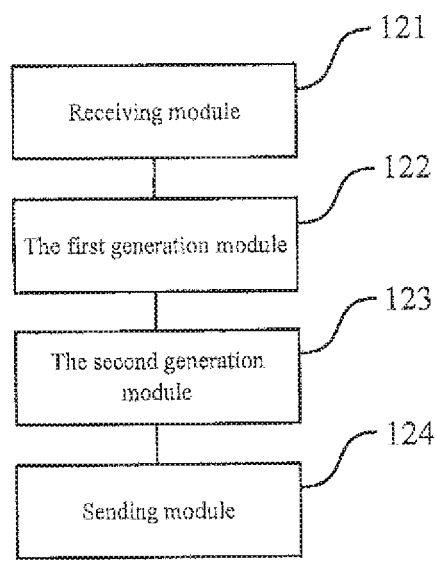
FIG. 12 is a structural diagram of the terminal equipment proposed in embodiments of the present invention.

To implement the technical solution, the embodiments of the present invention also provide the terminal equipment, whose structural diagram is shown in FIG. 12 and comprising:

A receiving module 121 receiving downlink data;

The first generation module generating K bits ACK/NACK feedback bits for the data in M downlink sub-frames on N configured downlink carriers, wherein, N≥1, M≥1, and the ACK/NACK feedback information of the data in M downlink sub-frames is transmitted in one uplink sub-frame;

The second generation module 123 generating S bits periodic CQI/PMI/RI feedback bits;

The sending module 124 simultaneous transmission of S bits periodic CQI/PMI/RI feedback bits generated by the second generation module 123 and K bits of ACK/NACK feedback information generated by the first generation module 122 in an uplink sub-frame using PUCCH format 3.

In actual application, the sending module 124 sends the PUCCH format 3 channel resource(s) applied to S bits periodic CQI/PMI/RI feedback bits and K bits of ACK/NACK feedback information, comprising:

The terminal equipment for transmitting the PUCCH format 3 channel resource(s) of periodic CQI/PMI/RI feedback bits; or The terminal equipment for transmitting the PUCCH format 3 channel resource(s) of ACK/NACK feedback bits.

Therein, when the PUCCH format 3 channel resource(s) used by the sending module 124 are the ones for transmitting periodic CQI/PMI/RI feedback bits and specifically a channel resource configured by higher layer signalling in advance;

When the channel resource of PUCCH format 3 used by the sending module 124 is the one for the terminal equipment to transmit ACK/NACK feedback bits, the channel resource is the one among those at least one channel resource(s) configured by higher layer signalling indicated by ACK/NACK feedback bits in PDCCHs, wherein, PDCCHs are used for transmitting the downlink grant of PDSCHs on the downlink secondary carrier and/or on the downlink primary carrier, and with the DAI value in the PDCCH larger than 1;

If the terminal equipment receives at least two PDCCHs, ACK/NACK resource indication bits in least two PDCCHs are used to indicate the same channel resource.

Besides, the first generation module 122 is used for:

Generating L bits ACK/NACK feedback bits for the data in M downlink sub-frames on N configured downlink carriers and T bits of assistant information, wherein, K is the sum of L and T.

Furthermore, in another application site, the first sending module 122 is specifically used for:

Generating 1 bit of ACK/NACK feedback information for each data packet received in the M downlink sub-frames on N configured downlink carriers, and generating 1 bit of NACK feedback information for each data packet detected to be missed;

Bundling the ACK/NACK feedback information for M downlink sub-frames, on each of N configured downlink carriers, to generate L (L≥1) ACK/NACK feedback bits or bundling the ACK/NACK feedback information for M downlink sub-frames, on all the configured downlink carriers, to generate 1 bit feedback bit.

Besides, the assistant information generated by the second generation module 123 is specifically used for:

Comprising at least M states, wherein, M states indicate the number, S (S≥1), of downlink sub-frames with PDCCH transmission received by the terminal equipment in M downlink sub-frames, and the PDCCH is used to transmit the downlink grant of PDSCH and/or is a PDCCH indicating the activation/release of semi-persistent PDSCH; or Comprising at least M states, wherein, M states indicate the number, S (S≥1), of downlink sub-frames with PDCCH transmission received by the terminal equipment in M downlink sub-frames, one of M state of the assistant information is used by multiplexing to indicate that the terminal equipment does not receive any downlink sub-frames with PDCCH transmission, and the PDCCH is used to transmit the downlink grant of PDSCH and/or is a PDCCH indicating the activation/release of semi-persistent PDSCH; or Comprising at least M+2 states, wherein, M states indicate the number, S (S≥1), of downlink sub-frames with PDCCH transmission received by the terminal equipment in M downlink sub-frames, an independent state different from the above M states of the assistant information is used to indicate that the terminal equipment only receives downlink sub-frames without corresponding PDCCH transmission, an independent state different from the above M+1 states is used to indicate that the terminal equipment does not receive any downlink sub-frames, and the PDCCH is used to transmit the downlink grant of PDSCH and/or is a PDCCH indicating the activation/release of semi-persistent PDSCH; or Comprising at least M+1 states, wherein, M states indicate the number, S≥1), of downlink sub-frames with PDCCH transmission received by the terminal equipment in M downlink sub-frames, an independent state different from the above M states of the assistant information is used to indicate that does not receive any downlink sub-frames with PDCCH transmission, and the PDCCH is used to transmit the downlink grant of PDSCH and/or is a PDCCH indicating the activation/release of semi-persistent PDSCH.

In another specific application site, the first generation module 122 is specifically used for:

Generating 1 bit of ACK/NACK feedback information for the data packet received in each downlink sub-frame of M downlink sub-frames on N configured downlink carriers and generating 1 bit of NACK feedback information for each data packet detected to be missed;

Generating M bits ACK/NACK feedback bits by performing bundling across the ACK/NACK feedback information for each downlink sub-frame of the M downlink sub-frames, on the N configured downlink carriers, wherein, K=M.

In another specific application site, the first generation module is specifically used for generating K bits of ACK/NACK feedback information according to the number of data packets received correctly by the terminal equipment in N configured downlink carriers and M downlink sub-frames.

Figure 13:
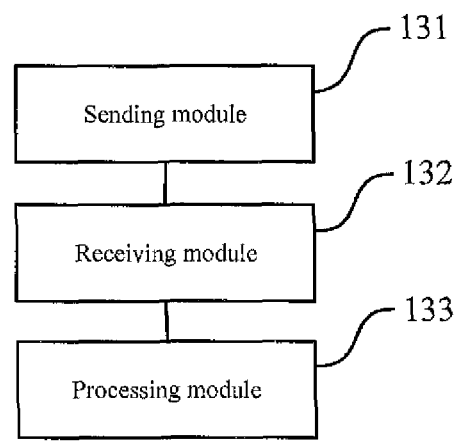
FIG. 13 a structural diagram of a base station proposed in embodiments of the present invention.

Besides, the embodiments of the present invention also provide a base station, whose structural diagram is shown in FIG. 13 and comprising:

The sending module 131 for sending downlink data to the terminal equipment;

The sending module 132 for receiving S bits periodic CQI/PMI/RI feedback bits and K bits of ACK/NACK feedback information sent by the terminal equipment simultaneously on the PUCCH format 3 channel resource(s), wherein, N≥1, M≥1, and ACK/NACK feedback information of the data in M downlink sub-frames are transmitted in one uplink sub-frame.

Therein, the PUCCH format 3 channel resource(s) used by the sending module 132 specifically comprises the followings:

The PUCCH format 3 channel resource(s) configured by a base station for the terminal equipment to transmit periodic CQI/PMI/RI feedback bits; or The PUCCH format 3 channel resource(s) configured by a base station for the terminal equipment to transmit ACK/NACK feedback bits.

Correspondingly, when the PUCCH format 3 channel resource(s) is the one configured by a base station for the terminal equipment to transmit periodic CQI/PMI/RI feedback bits, such channel resource is one of channel resources configured by the base station for the terminal equipment through higher layer signalling;

When the PUCCH format 3 channel resource(s) is the one configured by a base station for the terminal equipment to transmit ACK/NACK feedback bits, such channel resource is the one among those at least one channel resource(s) configured by higher layer signalling indicated by ACK/NACK resource indication bits sent by the base station to the terminal equipment, a PDCCH is used for transmitting the downlink grant of PDSCHs on the downlink secondary carrier and/or one downlink primary carriers, and with the DAI value in the PDCCH larger than 1;

If a base station sends at least two PDCCHs to the terminal equipment, ACK/NACK resource indication bits in at least two PDCCHs will indicate the same channel resource.

Furthermore, K bits ACK/NACK feedback bits received by the receiving module 132 specifically comprise the followings:

L bits ACK/NACK feedback bits and T bits of assistant information for the data generated by the terminal equipment for the data in M downlink sub-frames on N configured downlink carriers, wherein, K is the sum of L and T.

In another specific application site, L bits ACK/NACK feedback bits received by the receiving module 132 specifically comprise the followings:

The terminal equipment generates 1 bit of ACK/NACK feedback information for each data packet received in the M downlink sub-frames on N configured downlink carriers, and generates 1 bit of NACK feedback information for each data packet detected to be missed;

The terminal equipment generates L bits ACK/NACK feedback bits by performing bundling across the ACK/NACK feedback information corresponding to the M downlink sub-frames on each downlink carrier of the N configured downlink carriers, wherein, L≥N, or generate 1 bit ACK/NACK feedback bit by performing bundling across all the ACK/NACK feedback information corresponding to the M downlink sub-frames on all of the configured downlink carriers.

Besides, T bits of assistant information received by the sending module 132 are specifically used for:

Comprising at least M states, wherein, M states indicate the number, S (S≥1), of downlink sub-frames with PDCCH transmission received by the terminal equipment in M downlink sub-frames, and the PDCCH is used to transmit the downlink grant of PDSCH and/or is a PDCCH indicating the activation/release of semi-persistent PDSCH; or Comprising at least M states, wherein, M states indicate the number, S (S≥1), of downlink sub-frames with PDCCH transmission received by the terminal equipment in M downlink sub-frames, one of M state of the assistant information is used by multiplexing to indicate that the terminal equipment does not receive any downlink sub-frames with PDCCH transmission, and the PDCCH is used to transmit the downlink grant of PDSCH and/or is a PDCCH indicating the activation/release of semi-persistent PDSCH; or Comprising at least M+2 states, wherein, M states indicate the number, S (S≥1), of downlink sub-frames with PDCCH transmission received by the terminal equipment in M downlink sub-frames, an independent state different from the above M states of the assistant information is used to indicate that the terminal equipment only receives downlink sub-frames without corresponding PDCCH transmission, an independent state different from the above M+1 states is used to indicate that the terminal equipment does not receive any downlink sub-frames, and the PDCCH is used to transmit the downlink grant of PDSCH and/or is a PDCCH indicating the activation/release of semi-persistant PDSCH; or Comprising at least M+1 states, wherein, M states indicate the number, S≥1), of downlink sub-frames with PDCCH transmission received by the terminal equipment in M downlink sub-frames, an independent state different from the above M states of the assistant information is used to indicate that does not receive any downlink sub-frames with PDCCH transmission, and the PDCCH is used to transmit the downlink grant of PDSCH and/or is a PDCCH indicating the activation/release of semi-persistant PDSCH.

To be specific, K bits ACK/NACK feedback bits received by the receiving module 132 comprises the followings:

The terminal equipment generates 1 bit of ACK/NACK feedback information for each data packet received in each downlink sub-frame of M downlink sub-frames on N configured downlink carriers, and generates 1 bit of NACK feedback information for each data packet detected to be missed;

The terminal equipment generates M bits ACK/NACK feedback bits by performing bundling across the ACK/NACK feedback information for each downlink sub-frame of the M downlink sub-frames, on the N configured downlink carriers, wherein, K=M.

In another condition, K bits ACK/NACK feedback bits received by the receiving module 132 comprise the followings:

The terminal equipment generates K bits of ACK/NACK feedback information according to the number of data packets correctly received by the terminal equipment in N configured downlink carriers and M downlink sub-frames.

Furthermore, the base station also comprises the processing module 133, which is specifically used for determining the results of data receiving of the terminal equipment according to the contents of K bits of ACK/NACK feedback information received by the receiving module 132, and determining the retransmission decision of the data according to the results of data receiving, and retransmitting the data to the terminal equipment according to the retransmission decision.

Compared with the prior art, the embodiments of the present invention at least have the following advantages:

By way of using the technical solution of the embodiments of the present invention, the periodic CQI/PMI/RI feedback bits and ACK/NACK feedback information can be simultaneously transmitted in one uplink sub-frame using a PUCCH format 3 transmission 3 transmission scheme in an LTE-A system, thus avoiding the situation that the transmission of the periodic CQI/PMI/RI information needs to be abandoned when the ACK/NACK feedback information and the periodic CQI/PMI/RI information are transmitted simultaneously in one uplink sub-frame, improving the feedback efficiency of the uplink control information.

Through the description of the embodiments above, the technical personnel in this field can understand clearly that the present invention can be implemented by software and necessary general hardware platform or hardware (the former is better in most cases). Based on this understanding, the technical program therein can be embodied by a form of software products essentially which can be stored in a storage medium, comprising a number of instructions for making a computer device (such as CD-ROM, USB disks, mobile hard disks, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for simultaneous transmission of ACK/NACK feedback information and periodic CQI (Channel Quality Indication)/PMI (Precoding Matrix Indicator)/RI (Rank Indication) feedback bits, comprising:
   receiving downlink data by a terminal equipment;
   generating K bits ACK/NACK feedback bits for the data in M downlink sub-frames on N configured downlink carriers by the terminal equipment, wherein, N≥1, M≥1, and the ACK/NACK feedback information of the data in the M downlink sub-frames is transmitted in one uplink sub-frame;
   generating S bits periodic CQI/PMI/RI feedback bits by the terminal equipment; and
   sending S bits periodic CQI/PMI/RI feedback bits and K bits ACK/NACK feedback bits simultaneously in the uplink sub-frame using PUCCH (Physical Uplink Control Channel) format 3 by the terminal equipment;
   wherein, the PUCCH format 3 channel resource(s) used by the terminal equipment are the PUCCH format 3 channel resource(s) used by the terminal equipment to transmit ACK/NACK feedback bits.

2. The method of claim 1, wherein, the PUCCH format 3 channel resource(s) comprising:
   one channel resource among those at least one channel resource(s) configured by higher layer signalling indicated by ACK/NACK resource indication bits in a PDCCH (Physical Downlink Control Channel), wherein, the PDCCH is used to transmit the downlink grant of a PDSCH (Physical Downlink Shared Channel) on the downlink secondary carrier and/or on the downlink primary carrier, and with the DAI value in the PDCCH larger than 1; and
   if the terminal equipment receives at least two said PDCCHs, ACK/NACK resource indication bits in those PDCCHs indicate the same channel resource.

3. The method of claim 1, wherein, the terminal equipment generating K bits ACK/NACK feedback bits for the data in M downlink sub-frames on N configured downlink carriers, further comprising:
   generating L bits ACK/NACK feedback bits for the data in M downlink sub-frames on the N configured downlink carriers by the terminal equipment, and generating T bits of assistant information by the terminal equipment, wherein, K is the sum of L and T; or,
   generating 1 bit of ACK/NACK feedback information for each data packet received in each downlink sub-frame of the M downlink sub-frames on the N configured downlink carriers by the terminal equipment, and generating 1 bit of NACK feedback information for each data packet detected to be missed by the terminal equipment, generating M bits ACK/NACK feedback bits by performing bundling across the ACK/NACK feedback information for each downlink sub-frame of the M downlink sub-frames by the terminal equipment, on the N configured downlink carriers, wherein, K=M; or,
   generating K bits ACK/NACK feedback bits according to the number of data packets correctly received in the N configured downlink carriers and the M downlink sub-frames by the terminal equipment.

4. The method of claim 3, wherein, the terminal equipment generating L bits ACK/NACK feedback bits for the data in M downlink sub-frames on the N configured downlink carriers, further comprising:

generating 1 bit of ACK/NACK feedback information for each data packet received in the M downlink sub-frames on the N configured downlink carriers by the terminal equipment, and generating 1 bit of NACK feedback information for each data packet detected to be missed by the terminal equipment;

generating L bits ACK/NACK feedback bits by performing bundling across the ACK/NACK feedback information corresponding to the M downlink sub-frames on each downlink carrier of the N configured downlink carriers by the terminal equipment, wherein, L≥N; or, generating 1 bit of ACK/NACK feedback information for each data packet received in the M downlink sub-frames on the N configured downlink carriers by the terminal equipment, and generating 1 bit of NACK feedback information for each data packet detected to be missed by the terminal equipment;

generating 1 bit ACK/NACK feedback bit by performing bundling across all the ACK/NACK feedback information corresponding to the M downlink sub-frames on all of the configured downlink carriers by the terminal equipment; and/or, generating T bits of assistant information for the data in M downlink sub-frames on the N configured downlink carriers by the terminal equipment, comprising:

the assistant information comprising at least M states, wherein, M states are used to indicate the number, S (S≥1), of downlink sub-frames with PDCCH transmission received by the terminal equipment in the M downlink sub-frames, and the PDCCH is used to transmit the downlink grant of PDSCH and/or is a PDCCH indicating the activation/release of semi-persistent PDSCH; or, the assistant information comprising at least M states, wherein, M states indicate the number, S (S≥1), of downlink sub-frames with PDCCH transmission received by the terminal equipment in the M downlink sub-frames, one of the M states of the assistant information is used by multiplexing to indicate that terminal equipment does not receive any downlink sub-frames with PDCCH transmission, and the PDCCH is used to transmit the downlink grant of PDSCH and/or is a PDCCH indicating the activation/release of semi-persistent PDSCH; or, the assistant information comprising at least M+2 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment only receives downlink sub-frames without corresponding PDCCH transmission, an independent state different from the M+1 states is used to indicate that the terminal equipment does not receive any downlink sub-frames, and the PDCCH is used to transmit the downlink grant of PDSCH and/or is a PDCCH indicating the activation/release of semi-persistant PDSCHs; or, the assistant information comprising at least M+1 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment does not receive any downlink sub-frames with PDCCH transmission, and the PDCCH is used to transmit the downlink grant of PDSCH and/or is a PDCCH indicating the activation/release of semi-persistant PDSCH.

5. A terminal equipment, comprising:
a receiving module configured to receive downlink data;
a first generation module configured to generate K bits ACK/NACK feedback bits for the data in M downlink sub-frames on N configured downlink carriers, wherein, N≥1, M≥1, and the ACK/NACK feedback information of the data in the M downlink sub-frames is transmitted in one uplink sub-frame;
a second generation module configured to generate S bits periodic CQI/PMI/RI feedback bits;
a sending module configured to send S bits periodic CQI (Channel Quality Indication)/PMI PMI (Precoding Matrix Indicator)/RI (Rank Indication) feedback bits generated by the second generation module and K bits ACK/NACK feedback bits generated by the first generation module simultaneously in the uplink sub-frame using PUCCH (Physical Uplink Control Channel) format 3;
wherein, the PUCCH format 3 channel resource(s) used by the terminal equipment are the PUCCH format 3 channel resource(s) used by the terminal equipment to transmit ACK/NACK feedback bits.

6. The terminal equipment of claim 5, wherein:
when the PUCCH format 3 channel resource(s) used by the sending module is the one for the terminal equipment to transmit periodic CQI/PMI/RI feedback bits, such channel resource is the one configured by higher layer signalling in advance;
when the PUCCH format 3 channel resource(s) used by the sending module is the one for the terminal equipment to transmit periodic CQI/PMI/RI feedback bits, such channel resource is the one among those at least one channel resource(s) configured by higher layer signalling indicated by ACK/NACK resource indication bits in PDCCH (Physical Downlink Control Channel), the PDCCH is used to transmit the downlink grant of PDSCHs (Physical Downlink Shared Channel) on the downlink secondary carrier and/or on the downlink primary carrier and with the DAI value in the PDCCH larger than 1; and
if the terminal equipment receives at least two the said PDCCHs, ACK/NACK resource indication bits in those PDCCHs indicate the same channel resource.

7. The terminal equipment of claim 5, wherein, the first generation module is used to:
generate L bits ACK/NACK feedback bits for the data in M downlink sub-frames on the configured downlink carriers and L bits of assistant information, wherein, K is the sum of L and T; or,
generate 1 bit of ACK/NACK feedback information for each data packet received in each downlink sub-frame of the M downlink sub-frames on the N configured downlink carriers, and generate 1 bit of NACK feedback information for each data packet detected to be missed;
generate M bits ACK/NACK feedback bits by performing bundling across the ACK/NACK feedback information for each downlink sub-frame of the M downlink sub-frames, on the N configured downlink carriers, wherein, K=M; or, generate K bits ACK/NACK feedback bits according to the number of data packets received by the terminal equipment in the N configured downlink carriers and the M downlink sub-frames.

8. The terminal equipment of claim 7, wherein, the first generation module is used to:

generate 1 bit of ACK/NACK feedback information for each data packet received in the M downlink sub-frames on the N configured downlink carriers, and generate 1 bit of NACK feedback information for each data packet detected to be missed;

generate L bits ACK/NACK feedback bits by performing bundling across the ACK/NACK feedback information corresponding to the M downlink sub-frames on each downlink carrier of the N configured downlink carriers, wherein, L≥N, or generate 1 bit ACK/NACK feedback bit by performing bundling across all the ACK/NACK feedback information corresponding to the M downlink sub-frames on all of the configured downlink carriers; and/or, the assistant information generated by the second generation module is used to:

comprise at least M states, wherein, M states indicate the number, S (S≥1), of downlink sub-frames with PDCCH transmission received by the terminal equipment in the M downlink sub-frames, and the PDCCH is used to transmit the downlink grant of PDSCHs and/or is a PDCCH indicating the activation/release of semi-persistant PDSCH; or comprise at least M states, wherein, M states indicate the number, S (S≥1), of downlink sub-frames with PDCCH transmission received by the terminal equipment in the M downlink sub-frames, one of M state of the assistant information is used by multiplexing to indicate that the terminal equipment does not receive any downlink sub-frames with PDCCH transmission, and the PDCCH is used to transmit the downlink grant of PDSCHs and/or is a PDCCH indicating the activation/release of semi-persistant PDSCH; or comprise at least M+2 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment only receives downlink sub-frames without corresponding PDCCH transmission, an independent state different from the M+1 states is used to indicate that the terminal equipment does not receive any downlink sub-frames, and the PDCCH is used to transmit the downlink grant of PDSCHs and/or is a PDCCH indicating the activation/release of semi-persistant PDSCH; or comprise at least M+1 states, wherein, M states indicate the number, S (S≥1), of downlink sub-frames with PDCCH transmission received by the terminal equipment in the M downlink sub-frames, an independent state different from the M states of the assistant information is used to indicate that does not receive any downlink sub-frames with PDCCH transmission, and the PDCCH is used to transmit the downlink grant of PDSCH and/or is a PDCCH indicating the activation/release of semi-persistant PDSCH.

9. A method for simultaneous transmission of ACK/NACK feedback information and periodic CQI (Channel Quality Indication)/PMI PMI (Precoding Matrix Indicator)/RI (Rank Indication) feedback bits, wherein, comprising:

sending downlink data from a base station to a terminal equipment;

receiving at the base station S bits periodic CQI/PMI/RI feedback bits and K bits of ACK/NACK feedback information sent by the terminal equipment simultaneously on PUCCH (Physical Uplink Control Channel) format 3 channel resource(s), wherein, M≥1, and the ACK/NACK feedback information of the data in M downlink sub-frames is transmitted in one uplink sub-frame;

wherein, the PUCCH format 3 channel resource(s) used by the terminal equipment is the PUCCH format 3 channel resource(s) used by the terminal equipment to transmit ACK/NACK feedback bits.

10. The method of claim 9, wherein, the PUCCH format 3 channel resource(s) is the one configured by the base station for the terminal equipment to transmit periodic CQI/PMI/RI feedback bits, such PUCCH format 3 channel resource(s) comprising:

a channel resource configured by the base station in advance for the terminal equipment through higher layer signalling; or, when the PUCCH format 3 channel resource(s) is the one configured by the base station for the terminal equipment to transmit ACK/NACK feedback bits, such PUCCH format 3 channel resource(s) comprising:

one channel resource among those at least one channel resource(s) configured by higher layer signalling indicated by ACK/NACK resource indication bits in PDCCHs (Physical Downlink Control Channel) sent by the base station to the terminal equipment, wherein, the PDCCH is used to transmit the downlink grant of PDSCH (Physical Downlink Shared Channel) on the downlink secondary carrier and/or on the downlink primary carrier and with the DAI value in the PDCCH larger than 1; and if the base station sends at least two the said PDCCHs to the terminal equipment, ACK/NACK resource indication bits in those PDCCHs indicate the same channel resource.

11. The method of claim 9, wherein, the K bits ACK/NACK feedback bits received by the base station comprise:

L bits ACK/NACK feedback bits and T bits of assistant information generated by the terminal equipment for the data in the M downlink sub-frames on the N configured downlink carriers, wherein, K is the sum of L and T; or, the terminal equipment generating 1 bit of ACK/NACK feedback information for each data packet received in each downlink sub-frame of the M downlink sub-frames on the N configured downlink carriers, and generating 1 bit of NACK feedback information for each data packet detected to be missed;

the terminal equipment generating M bits ACK/NACK feedback bits by performing bundling across the ACK/NACK feedback information for each downlink sub-frame of the M downlink sub-frames, on the N configured downlink carriers, to, wherein, K=M; or, the terminal equipment generating K bits ACK/NACK feedback bits according to the number of data packets received by the terminal equipment in the N configured downlink carriers and the M downlink sub-frames.

12. The method of claim 11, wherein, L bits ACK/NACK feedback bits received by the base station comprise:

the terminal equipment generating 1 bit of ACK/NACK feedback information for each data packet received in the M downlink sub-frames on the N configured downlink carriers, and generating 1 bit of NACK feedback information for each data packet detected to be missed;

the terminal equipment generating L bits ACK/NACK feedback bits by performing bundling across the ACK/NACK feedback information corresponding to the M downlink sub-frames on each downlink carrier of the N configured downlink carriers, wherein, L≥N; or, the terminal equipment generating 1 bit of ACK/NACK feedback information for each data packet received in the M downlink sub-frames on the N configured downlink carriers, and generating 1 bit of NACK feedback information for each data packet detected to be missed;

the terminal equipment generating 1 bit ACK/NACK feedback bit by performing bundling across all the ACK/NACK feedback information corresponding to the M downlink sub-frames on all of the configured downlink carriers; and/or, T bits of assistant information received by the base station comprise:

the assistant information comprises at least M states, wherein, M states indicate the number, S (S≥1), of downlink sub-frames with PDCCH transmission received by the terminal equipment in the M downlink sub-frames, and the PDCCH is used to transmit the downlink grant of PDSCH and/or is a PDCCH indicating the activation/release of semi-persistant PDSCH; or, the assistant information comprising at least M states, wherein, M states indicate the number, S (S≥1), of downlink sub-frames with PDCCH transmission received by the terminal equipment in the M downlink sub-frames, one of M state of the assistant information is used by multiplexing to indicate that the terminal equipment does not receive any downlink sub-frames with PDCCH transmission, and the PDCCH is used to transmit the downlink grant of PDSCH and/or is a PDCCH indicating the activation/release of semi-persistant PDSCH; or, the assistant information comprising at least M+2 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment only receives downlink sub-frames without corresponding PDCCH transmission, an independent state different from the M+1 states is used to indicate that the terminal equipment does not receive any downlink sub-frames, and the PDCCH is used to transmit the downlink grant of PDSCH and/or is ad PDCCH indicating the activation/release of semi-persistant PDSCH; or, the assistant information comprising at least M+1 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment does not receive any downlink sub-frames with PDCCH transmission, and the PDCCH is used to transmit the downlink grant of PDSCH and/or is a PDCCH indicating the activation/release of semi-persistant PDSCH.

13. The method of claim 9, wherein, after the base station receives S bits periodic CQI/PMI/RI feedback bits and K bits of ACK/NACK feedback information sent by the terminal equipment simultaneously, the method further comprises:

determining, by the base station, the results of data receiving of the terminal equipment according to the content of the received K bits of ACK/NACK feedback information, and determining, by the base station the retransmission decision of the data according to the results of data receiving, and retransmitting the data to the terminal equipment according to the retransmission decision.

14. A base station, comprising:

a sending module configured to send downlink data to the terminal equipment;

a receiving module configured to receive S bits periodic CQI (Channel Quality Indication)/PMI PMI (Precoding Matrix Indicator)/RI (Rank Indication) feedback bits and K bits of ACK/NACK feedback information sent by the terminal equipment simultaneously, wherein, M≥1, and the ACK/NACK feedback information of the data in M downlink sub-frames is transmitted in one uplink sub-frame;

wherein, PUCCH (Physical Uplink Control Channel) format 3 channel resource(s) used by the terminal equipment is the PUCCH format 3 channel resource(s) used by the terminal equipment to transmit ACK/NACK feedback bits.

15. The base station of claim 14, wherein, when the PUCCH format 3 channel resource(s) is the one configured by the base station for the terminal equipment to transmit periodic CQI/PMI/RI feedback bits, such channel resource is the one configured by the base station in advance for the terminal equipment through higher layer signalling;

when the PUCCH format 3 channel resource(s) is the one configured by the base station for the terminal equipment to transmit periodic CQI/PMI/RI feedback bits, such channel resource is the one among those at least one channel resource(s) configured by higher layer signalling indicated by ACK/NACK resource indication bits in the PDCCH (Physical Downlink Control Channel) sent by the base station to the terminal equipment, the PDCCH is used to transmit the downlink grant of PDSCH (Physical Downlink Shared Channel) on the downlink secondary carrier and/or on the downlink primary carrier, and with the DAI value in the PDCCH larger than 1; and if the base station sends at least two the said PDCCHs to the terminal equipment, ACK/NACK resource indication bits in those PDCCHs indicate the same channel resource.

16. The base station of claim 15, wherein, the K bits ACK/NACK feedback bits received by the receiving module comprise:

L bits ACK/NACK feedback bits and T bits of assistant information generated by the terminal equipment for the data in the M downlink sub-frames on the N configured downlink carriers, wherein, K is the sum of L and T; or, the terminal equipment generating 1 bit of ACK/NACK feedback information for each data packet received in each downlink sub-frame of the M downlink sub-frames on the N configured downlink carriers, and generating 1 bit of NACK feedback information for each data packet detected to be missed;

the terminal equipment generating M bits ACK/NACK feedback bits by performing bundling across the ACK/NACK feedback information for each downlink sub-frame of the M downlink sub-frames, on the N configured downlink carriers, to, wherein, K=M; or, the terminal equipment generating K bits ACK/NACK feedback bits according to the number of data packets received correctly by the terminal equipment in the N configured downlink carriers and the M downlink sub-frames.

17. The base station of claim 16, wherein, the L bits ACK/NACK feedback bits received by the base station comprise:

the terminal equipment generating 1 bit of ACK/NACK feedback information for each data packet received in the M downlink sub-frames on the N configured downlink carriers, and generating 1 bit of NACK feedback information for each data packet detected to be missed;

the terminal equipment generating L bits ACK/NACK feedback bits by performing bundling across the ACK/NACK feedback information corresponding to the M downlink sub-frames on each downlink carrier of the N configured downlink carriers, wherein, L≥N, or the terminal equipment generating 1 bit ACK/NACK feedback bit by performing bundling across all the ACK/NACK feedback information corresponding to the M downlink sub-frames on all of the configured downlink carriers; and/or, the T bits of assistant information received by the receiving module comprise:

at least M states, wherein, M states indicate the number, S (S≥1), of downlink sub-frames with PDCCH transmission received by the terminal equipment in the M downlink sub-frames, and the PDCCH is used to transmit the downlink grant of PDSCH and/or is a PDCCH indicating the activation/release of semi-persistant PDSCH; or at least M states, wherein, M states indicate the number, S (S≥1), of downlink sub-frames with PDCCH transmission received by the terminal equipment in the M downlink sub-frames, one of M state of the assistant information is used by multiplexing to indicate that the terminal equipment does not receive any downlink sub-frames with PDCCH transmission, and the PDCCH is used to transmit the downlink grant of PDSCH and/or is a PDCCH indicating the activation/release of semi-persistant PDSCH; or at least M+2 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment only receives downlink sub-frames without corresponding PDCCH transmission, an independent state different from the M+1 states is used to indicate that the terminal equipment does not receive any downlink sub-frames, and the PDCCH is used to transmit the downlink grant of PDSCH and/or is a PDCCH indicating the activation/release of semi-persistant PDSCH; or at least M+1 states, wherein, M states indicate the number, S (S≥1), of downlink sub-frames with PDCCH transmission received by the terminal equipment in the M downlink sub-frames, an independent state different from the M states of the assistant information is used to indicate that the terminal equipment does not receive any downlink sub-frames with PDCCH transmission, and the PDCCH is used to transmit the downlink grant of PDSCH and/or is a PDCCH indicating the activation/release of semi-persistant PDSCH.

18. The base station of claim 14, further comprising a processing module configured to:

determine the results of the data receiving for the terminal equipment according to content of the received K bits of ACK/NACK feedback information, determine the retransmission decision of the data according to the results of the data receiving, and retransmit the data to the terminal equipment according to the retransmission decision.

* * * * *